US009020428B2

(12) United States Patent
Meunier et al.

(10) Patent No.: US 9,020,428 B2
(45) Date of Patent: Apr. 28, 2015

(54) METHODS AND SYSTEMS FOR CONTROLLING NFC-CAPABLE MOBILE COMMUNICATIONS DEVICES

(71) Applicant: BlackBerry Limited, Waterloo (CA)

(72) Inventors: Marc Élis Meunier, Kitchener (CA); Vahid Moosavi, Kitchener (CA); Kevin Howard Orr, Elmira (CA)

(73) Assignee: BlackBerry Limited, Waterloo (CA)

(*) Notice: Subject to any disclaimer, the term of this patent is extended or adjusted under 35 U.S.C. 154(b) by 19 days.

(21) Appl. No.: 13/939,734

(22) Filed: Jul. 11, 2013

(65) Prior Publication Data

US 2015/0017909 A1    Jan. 15, 2015

(51) Int. Cl.
*H04B 5/00* (2006.01)
*H04N 5/232* (2006.01)

(52) U.S. Cl.
CPC .............. *H04B 1/401* (2013.01); *H04B 5/0025* (2013.01); *H04N 5/23229* (2013.01)

(58) Field of Classification Search
CPC .... H04W 4/008; H04B 1/3888; H04B 5/0025
USPC ........ 455/41.1, 41.2, 41.3, 575.1, 575.8, 90.3
See application file for complete search history.

(56) References Cited

U.S. PATENT DOCUMENTS

| | | | |
|---|---|---|---|
| 2006/0022814 A1 | 2/2006 | Nogami et al. | |
| 2010/0093412 A1* | 4/2010 | Serra et al. | 455/575.8 |
| 2012/0040610 A1 | 2/2012 | Moosavi et al. | |
| 2012/0299864 A1 | 11/2012 | Tong et al. | |
| 2012/0303520 A1* | 11/2012 | Huang | 705/39 |
| 2014/0091758 A1* | 4/2014 | Hidaka et al. | 320/108 |

FOREIGN PATENT DOCUMENTS

| | | |
|---|---|---|
| EP | 2527955 A1 | 11/2012 |
| EP | 2533506 A1 | 12/2012 |

OTHER PUBLICATIONS

European Patent Office, European Search Report dated Dec. 13, 2013, issued in European Patent Application No. 13176060.5.
(Continued)

*Primary Examiner* — Tuan Pham
(74) *Attorney, Agent, or Firm* — Ridout & Maybee LLP

(57) ABSTRACT

NFC-capable systems and devices, and related methods, for controlling operation of an NFC-capable mobile device are disclosed. Through NFC communication, the NFC-capable mobile device detects a load associated with a surface proximate the NFC-capable mobile device. Based at least partly on a determined sustained intensity of the load, the NFC-capable mobile device triggers operation of a camera of the NFC-capable mobile device to capture an image of the surface proximate the NFC-capable mobile device. Based at least partly on a determined correspondence of the captured image with stored image data, the NFC-capable mobile device executes a device control command, such as to control some aspect of the NFC-capable mobile device based on the detected surface, which may be part of a holster for holstering the NFC-capable mobile device.

20 Claims, 13 Drawing Sheets

(56) References Cited

OTHER PUBLICATIONS

Techno Buffalo, "Broadcom Explains the Current State, and Future, of NFC (Interview)", Sep. 5, 2013, http://www.technobuffalo.com/2012/07/27/broadcom-explains-the-current-state-and-futur . . .

Broadcom, "BCM2079x Family—Near Field Communications (NFC) Controller Family", Sep. 5, 2013, http://broadcom.com.products/NFC/NFC-Solutions/BCM2079x-Family.

Stack Overflow, "NFC Tag—Starting Camera activity—and take a picture?", Sep. 5, 2013, http://stackoverflow.com/questions/12821024/nfc-tag-starting-camera-activity-and-take-a . . .

"Recipe: NFC Starts Camera", Sep. 5, 2013, http://dev.onx.ms/forum/topic/recipe-nfc-starts-camera/.

You Tube, "Use NFC tag to take a photo", Sep. 5, 2013, http://www.youtube.com/watch?v=vUEyTVNi0Zk.

\* cited by examiner

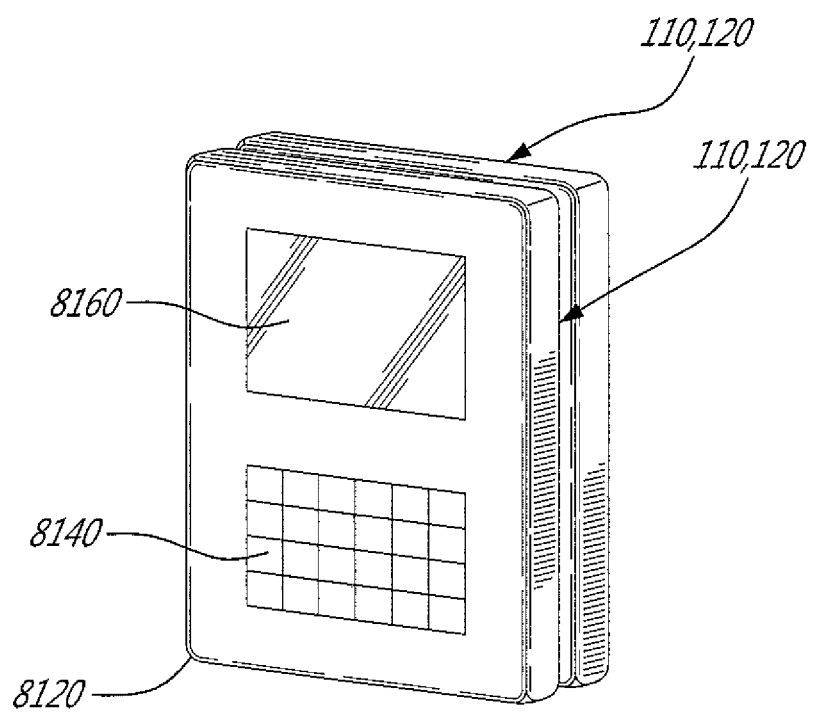

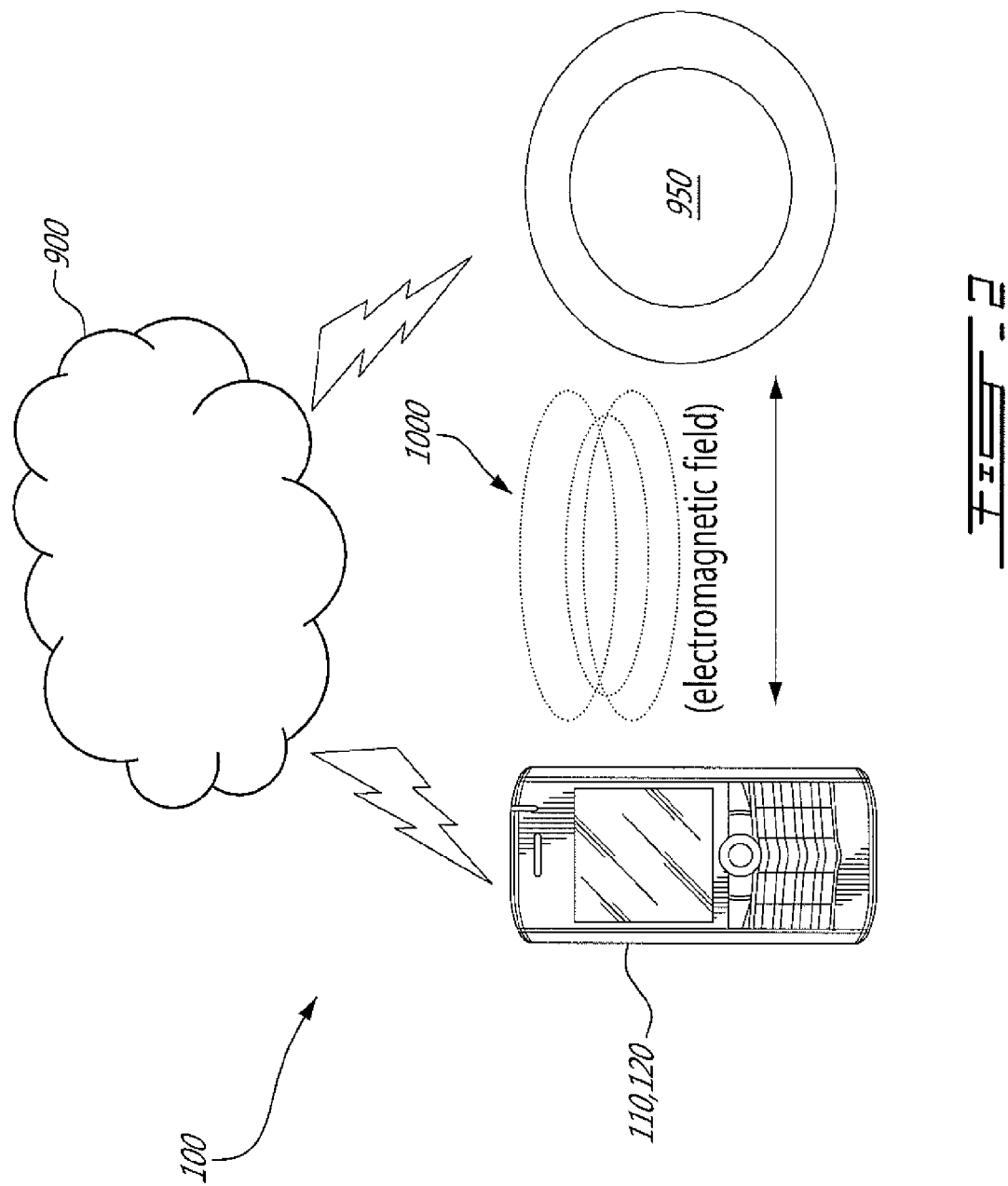

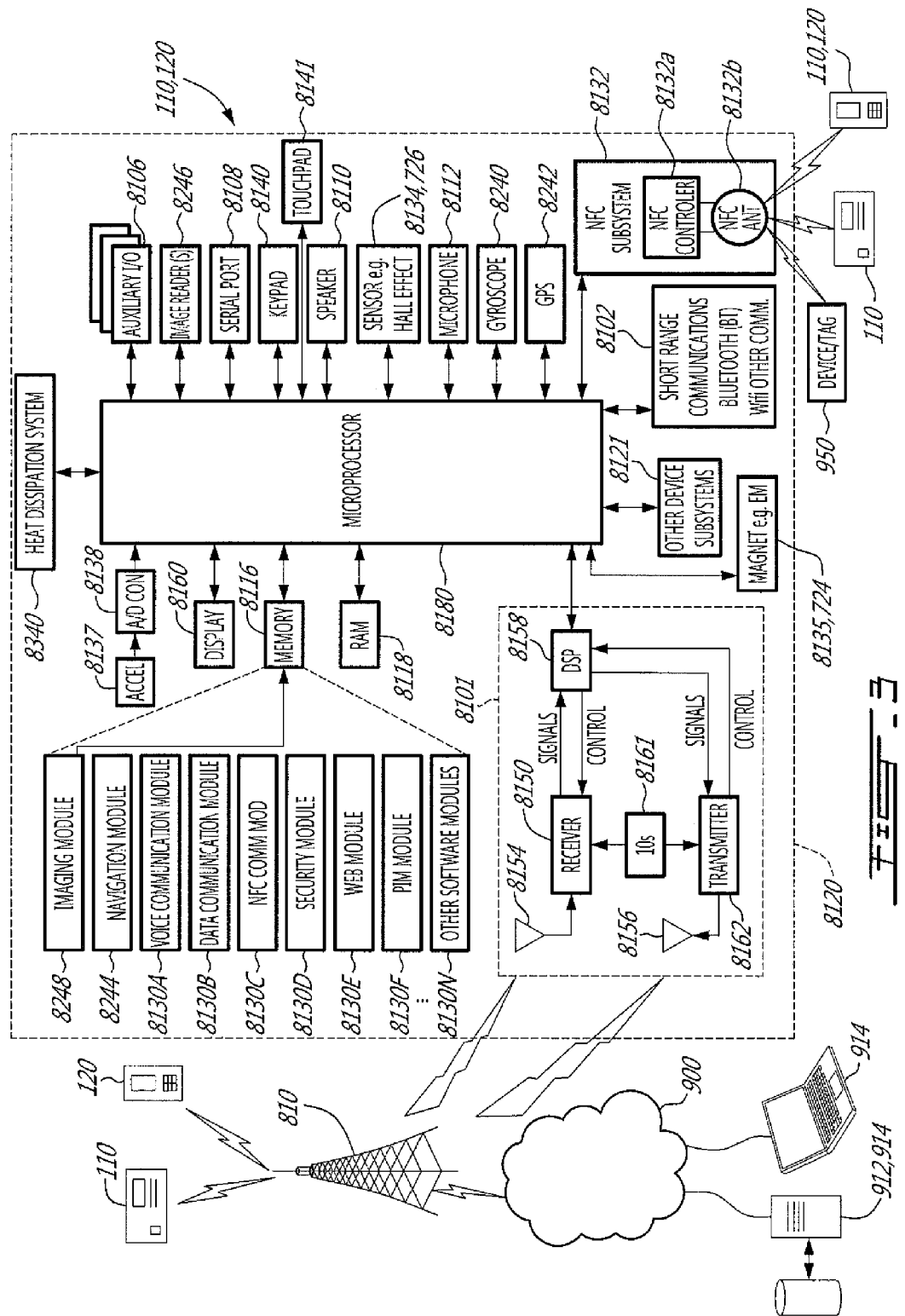

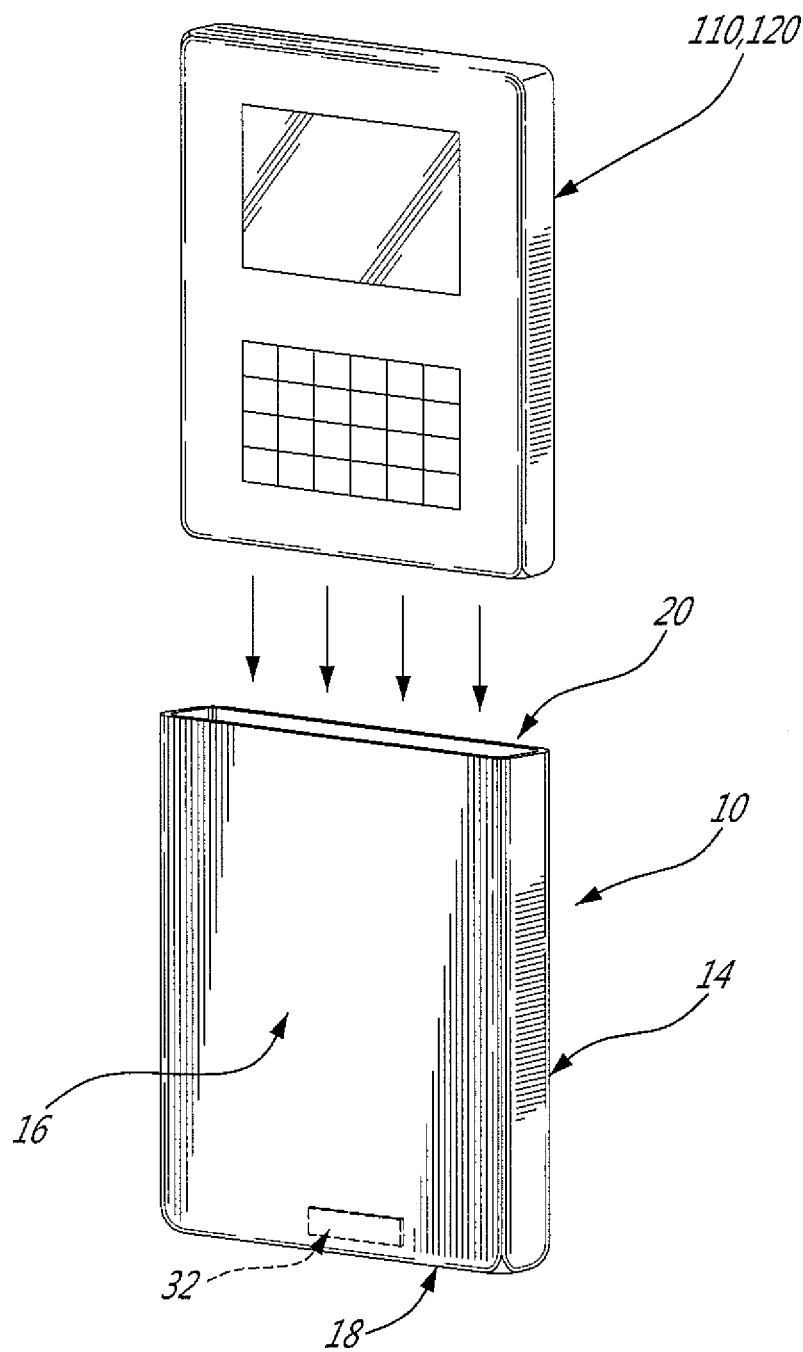

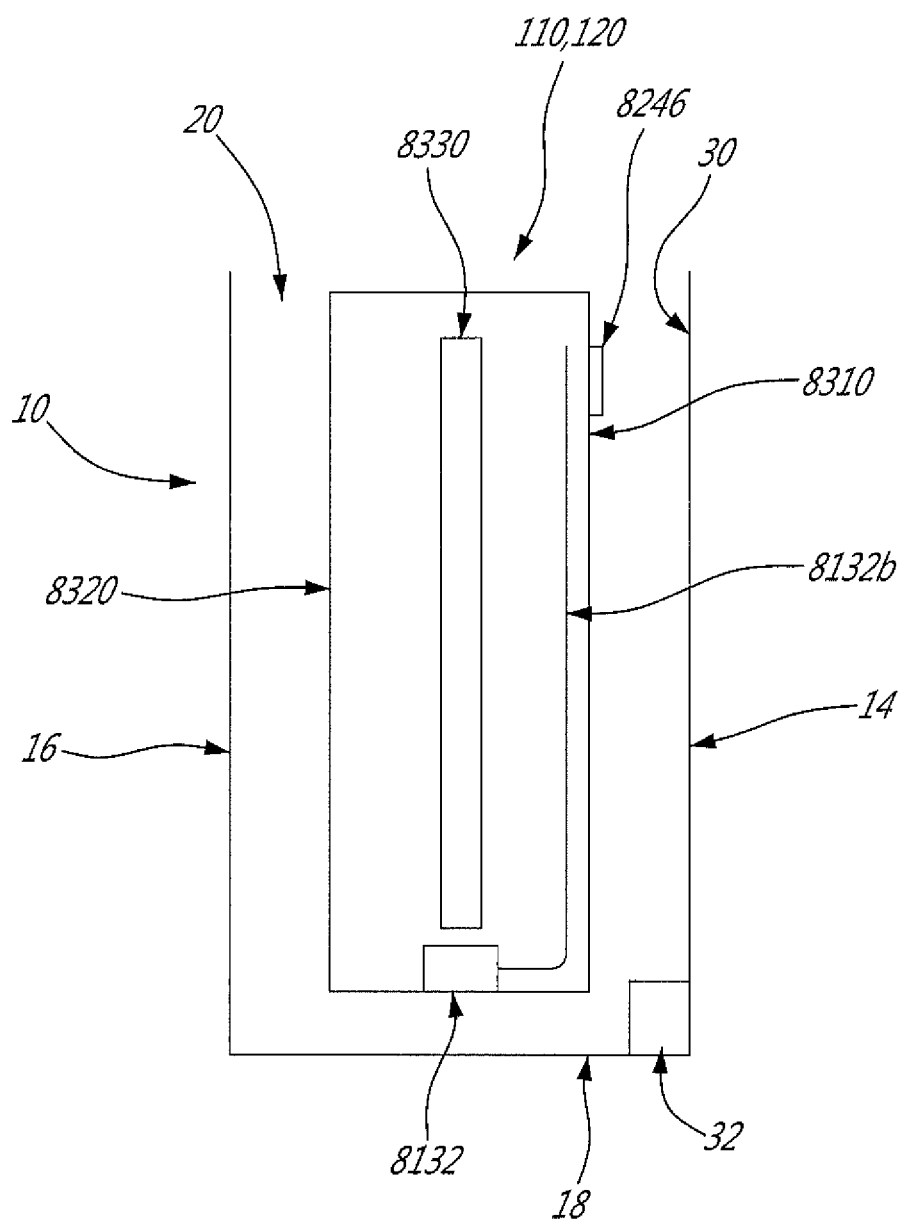

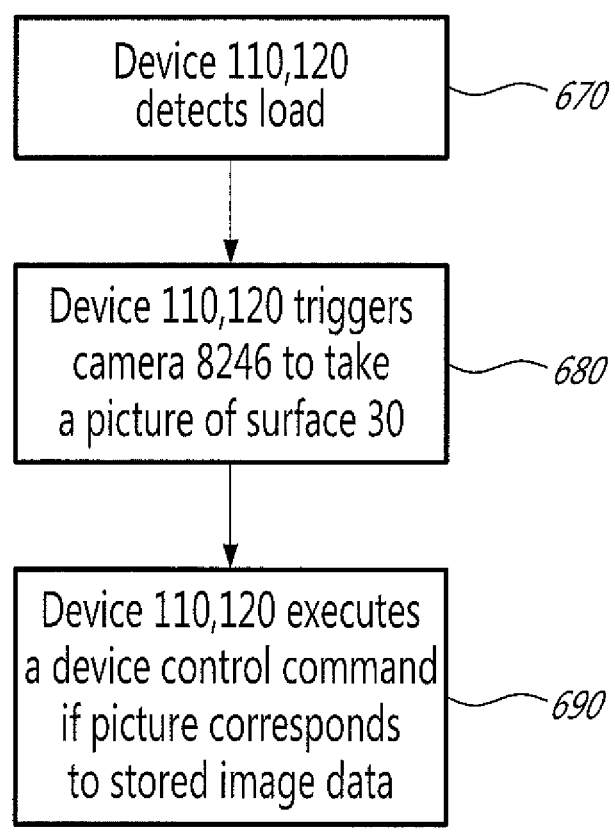

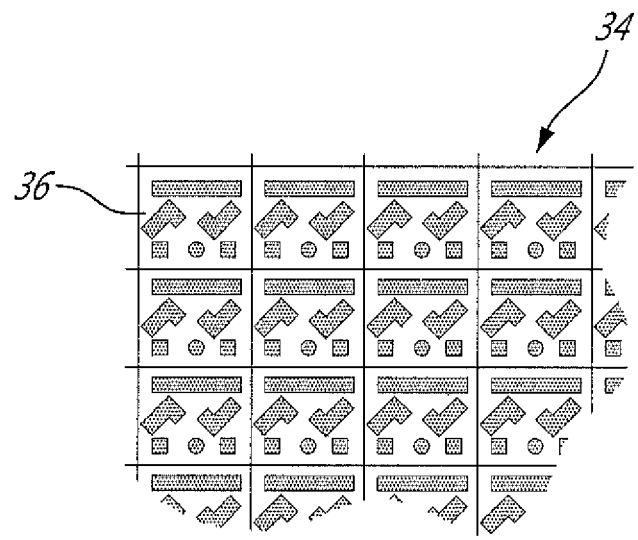
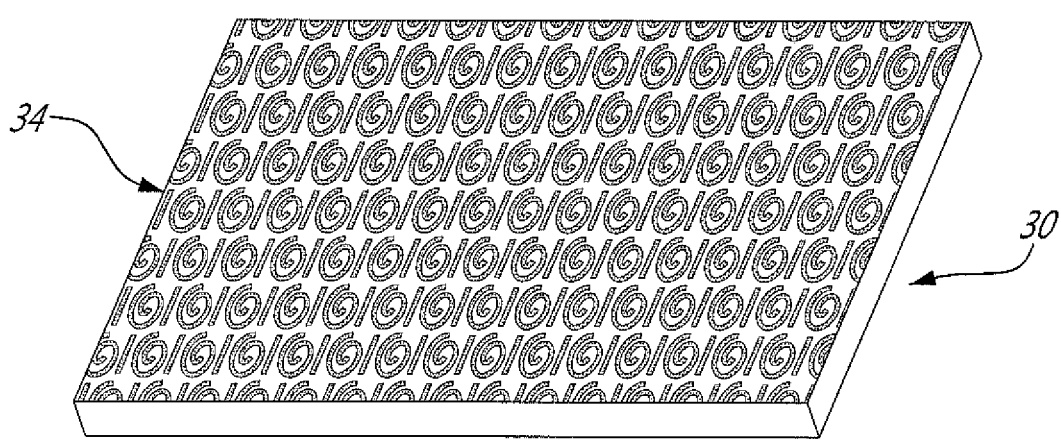

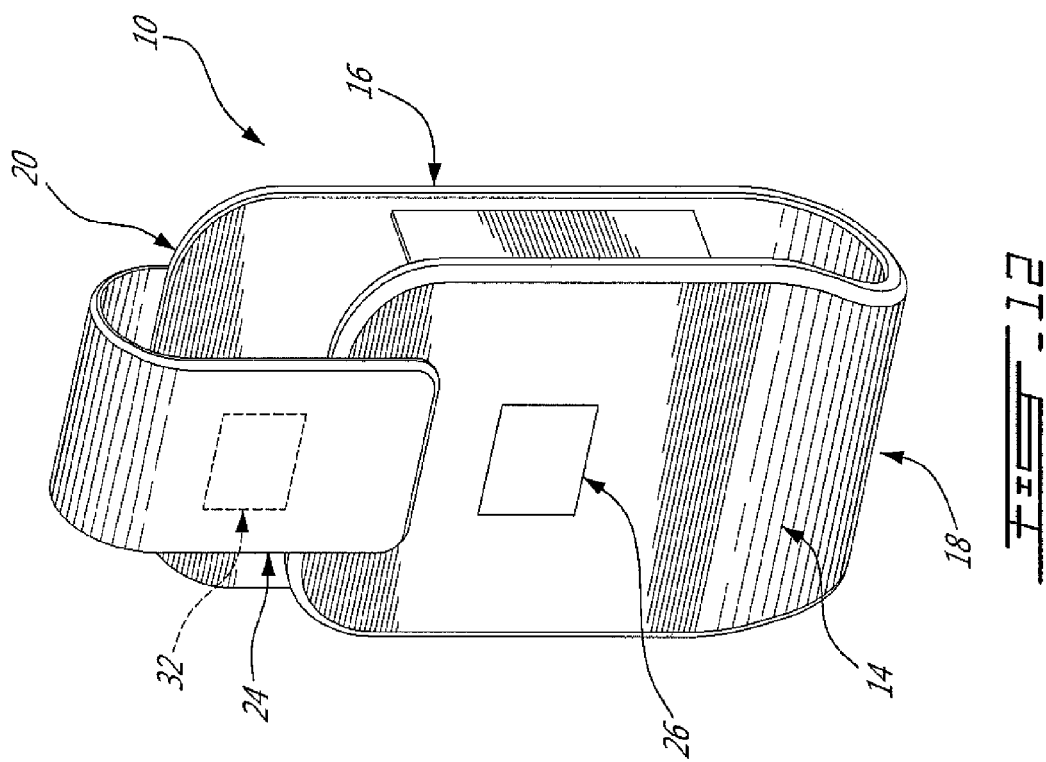
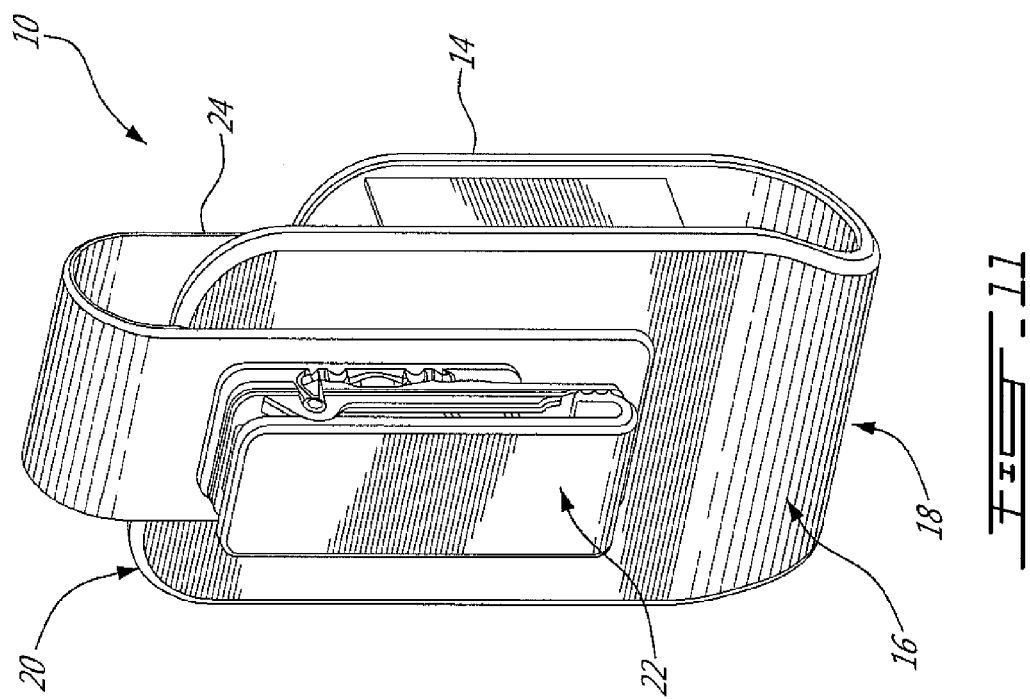

METHODS AND SYSTEMS FOR CONTROLLING NFC-CAPABLE MOBILE COMMUNICATIONS DEVICES

FIELD OF THE DISCLOSURE

This application relates to mobile communication devices, and more particularly, to the control of mobile communication devices capable of Near Field Communication (NFC).

BACKGROUND

Mobile devices, such as hand-held electronic devices, wireless communication devices, and the like, are often suited for placement in a holster, such as a belt-mounted holster, or other holder, carry case, cover or the like. Typically, the mobile device will be placed in its holster when not in use, for example in order to protect and conveniently transport the device.

It can be desirable to automatically detect when the mobile device is holstered, and to alter operating conditions of the mobile device upon such detection. For example, input components such as keyboards, touch screens, and the like can be disabled when the mobile device is holstered, to avoid inadvertent key presses, which may cause undesired activation of mobile device functions, undesired settings changes, increased battery drain, and other problems.

Various solutions to this problem have been proposed, for example by adding a magnet and magnetic sensor to the holster and device, respectively, in order to trigger the mobile device into a standby mode upon detection of the holster magnet. However, existing solutions require additional hardware to be incorporated into the mobile device, which may increase device complexity and cost.

Improvement is therefore desirable.

DESCRIPTION OF DRAWINGS

Examples of various aspects and embodiments of the invention are shown in the drawings, and described therein and elsewhere throughout the disclosure. In the drawings, like references indicate like parts.

FIG. 1a is an axonometric view of two mobile devices engaging in near-field communication (NFC) with one another.

FIG. 2 shows interaction between a mobile device and a NFC tag.

FIG. 3 is a schematic diagram of a mobile device suitable for use in implementing various aspects of the disclosure.

FIGS. 4a and 4b are axonometric views of exemplary implementations of inserting a mobile device in a holster suitable for use in implementing various aspects of the disclosure.

FIG. 5 is a schematic elevation view of a holstered mobile device suitable for use in implementing various aspects of the disclosure.

FIGS. 6a and 6b are schematic flow diagrams of exemplary processes suitable for use in implementing various aspects of the disclosure.

FIGS. 8 and 9 are exemplary diagrams of visual characteristics for identification in accordance with various aspects of the disclosure.

FIGS. 11 and 12 are axonometric views of a mobile device covering useful in implementing various aspects of the disclosure.

DETAILED DESCRIPTION

Figure 1:
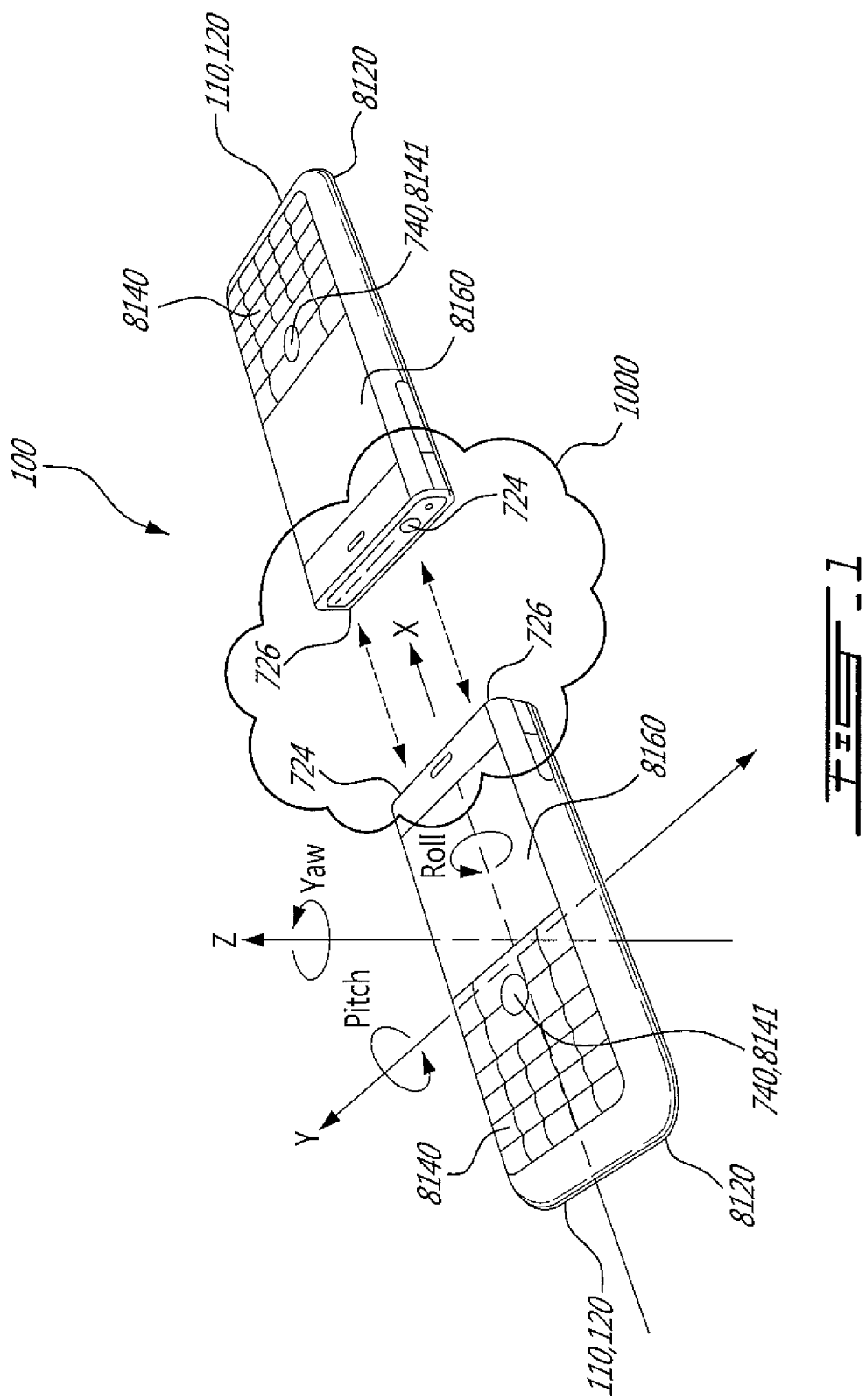
FIG. 1 is an axonometric view of two mobile devices engaging in near-field communication (NEC) with one another.

In various aspects, the disclosure discloses systems, methods, devices, and computer programming products for mobile devices capable of near field communication ("NFC") to execute a device control command when moved near or against a surface having a visual characteristic such as a pattern thereupon that is detectable by and known to the NFC-capable mobile device.

A NFC subsystem of the NFC-capable mobile device may poll for NFC signals. Upon detecting the presence of a NEC-detectable load of a predetermined magnitude or matching a stored profile through the NFC subsystem, the NFC-capable mobile device may trigger the operation of a camera component of the NFC-capable mobile device to take a picture. The NFC-capable mobile device may attempt to match that picture comprising a digital image of a surface proximate the NFC-capable mobile device to stored image data. If a match is found, the NFC-capable mobile device may execute a device control command based on the match. For example, the device control command may be associated based on the identification of a known surface based on the match. For example, the NFC-capable mobile device may be configured to execute the device control command (e.g., change a mode of operation, such as entering into a low-power mode) upon determining that the NFC-capable mobile device is proximate a surface of a particular covering, such as a holster having attached thereto a member (e.g. a plate) comprising, for example, ferrite, a ferrous or other metallic material that may cause the predetermined load to be detected by the NFC subsystem. Upon removal of the NEC-capable mobile device from the holster, when the load is no longer detected by the NFC subsystem, the NFC-capable mobile device may likewise execute a device control command, for example to exit the low-power mode.

The methods, devices and systems disclosed herein may be used to identify a holster into which the NFC-capable device has been inserted. For example, the NFC-capable device may be configured to recognize two or more holsters (e.g., work and personal) and may be configured to execute one or more different control commands depending on which of the two or more holsters it has been inserted into and has been recognized by the NFC-capable device.

For example, in a first aspect, the disclosure discloses a method performed by at least one processor of a NEC-capable mobile device, the NEC-capable mobile device comprising a camera and at least one NFC subsystem, the method comprising: detecting a load upon the at least one NFC subsystem of the NFC-capable mobile device, the load being associated with a surface proximate the NFC-capable mobile device; based at least partly on a determination of sustained intensity of the load, triggering operation of the camera to capture an image of the surface proximate the NEC-capable mobile device; and based at least partly on a determined correspondence of the captured image with stored image data, executing a device control command.

In various embodiments, the methods disclosed herein may comprise, based at least partly on a determined lack of correspondence of the captured image with the stored image data, associating the captured image with an identification of the surface proximate the NFC-capable mobile device based on the receipt of user input. The captured image may be that of a visual characteristic comprising at least one first portion and at least one second portion where the first portion has a higher reflectivity than the second portion. The surface may be located on an interior portion of a covering for the NFC-capable mobile device. The surface may be located on a charging device for contact with the NFC-capable mobile device. The load may be associated with a metallic plate attached to or part of the surface proximate of the NFC-capable mobile device. The sustained intensity determination may comprise determining a correspondence between the sustained intensity of the load and at least one stored load profile. The sustained intensity of the load may comprise substantial saturation of the at least one NFC subsystem. The methods disclosed herein may comprise, based at least partly on the at least one NFC subsystem detecting removal of the detected load, executing a second device control command.

In another aspect, the disclosure discloses a method performed by at least one processor of a NEC-capable mobile device, the NEC-capable mobile device comprising a camera and at least one NFC subsystem, the method comprising: upon insertion of the NEC-capable mobile device into a holster, detecting a load upon the at least one NEC subsystem of the NFC-capable mobile device; based at least partly on a determination of sustained intensity of the load, triggering operation of the camera to capture an image of a visual characteristic disposed on an interior surface of the holster proximate the camera; and based at least partly on a determined correspondence of the captured image with stored image data, executing a device control command.

In various embodiments, the load may be associated with a load object attached to or part of the holster. The determined correspondence of the captured image with stored image data may be indicative of an identification of the holster. The device control command may be based on the identification of the holster.

In another aspect, the disclosure discloses a NFC-capable mobile device comprising: at least one processor; a camera; at least one NFC subsystem; and a medium including machine-readable instructions executable by at least one processor and configured to cause the at least one processor to: detect a load upon the at least one NFC subsystem of the NFC-capable mobile device, the load associated with a surface proximate the NFC-capable mobile device; based at least partly on a determination of sustained intensity of the load, trigger operation of the camera to capture an image of the surface proximate the NFC-capable mobile device; and based at least partly on a determined correspondence of the captured image with stored image data, execute a device control command.

In various embodiments, the instructions may be configured to cause the processor to, based at least partly on a determined lack of correspondence of the captured image with the stored image data, associate the captured image with an identification of the surface proximate the NFC-capable mobile device based on the receipt of user input. The NFC-capable mobile device may comprise a camera flash configured to illuminate the surface proximate the camera, wherein the instructions may be configured to cause the processor to trigger operation of the camera flash together with the operation of the camera. The detected load may be indicative of a metallic plate proximate to the NFC-capable mobile device. The sustained intensity determination comprises determining a correspondence between the sustained intensity of the load and at least one stored load profile. The sustained intensity of load may comprise saturation of the at least one NFC subsystem. The instructions may be configured to cause the processor to, based at least partly on the at least one NFC subsystem detecting removal of the detected load, execute a second device control command.

In various aspects, the disclosure discloses computer program products having a non-transitory computer readable medium tangibly embodying computer executable code which, when executed by a processor of a NFC-capable device, causes the respective device or resource to perform the aforementioned methods.

Near-field communication(s) (NFC) are wireless communications between two or more suitably-configured devices when the devices are placed or otherwise disposed within a desired, typically relatively proximity to one another. Such communications can, for example, be initiated on a fully or partially automatic basis when the two or more devices are placed within desired proximity of one another, and can occur between any two or more of active and/or passive NFC devices.

As will be appreciated by those skilled in the relevant arts, once they have been made familiar with this disclosure, NFC communications in accordance with this disclosure can be conducted according to any suitable protocols, including a number of protocols now in widespread public use, as well as protocols yet to be developed.

In general, an NFC transaction, or data transfer, may be initiated by bringing two or more NFC-capable devices into close proximity of one another. "Close proximity" can, as will be apparent to those skilled in the relevant arts, once they have been made familiar with this disclosure, mean any proximity suitable to a desired purpose, and typically means sufficient), close that it may be presumed that communications between the two or more NFC devices is desired. For current NFC applications, for example, "close proximity" can mean one or several centimeters, or shorter or longer distances, depending for example upon the purpose and nature of the NFC transaction and the NFC-capable devices. The action of bringing such NFC-capable devices into sufficiently close proximity may trigger automatic or semi-automatic activation of an NFC circuit, and/or an NFC communication. A NFC transaction, or NFC data transfer, may include one NFC-capable device transferring data to the other, or two or more devices each transferring and/or receiving data from at least one of the other devices. Where devices both transmit and receive data from one another through an NFC transaction, this may be called a NFC data interchange.

For purposes of this disclosure, NFC communications may be conducted according to any desired wireless communications protocol(s), including for example those published or otherwise adopted by the various NFC and/or Radio Frequency Identification (RFID) industry federations, councils, groups, and boards, and their members, as well as any or all of Bluetooth or WIN wireless protocols, including for example any or all of Code Division Multiple Access (CDMA), Time Division Multiple Access (TDMA), Frequency Division Multiple Access (FDMA), Orthogonal Frequency Division Multiple Access (OFDMA), Single Carrier Frequency Division Multiple Access (SC-FDMA), GSM, 3GPP, 4G, or other wireless protocols.

FIG. 1 shows an example of an NFC system 100 suitable for use in implementing various aspects of the disclosure. In the embodiment shown in FIG. 1, system 100 comprises two active NFC-capable devices 110, in the form of smartphones or other wireless handheld or mobile devices 120. Bringing active NFC-capable devices 110, 120 close enough together, by for example moving them physically toward each other into very close proximity, or into actual physical contact, can provide an operationally easy interface to set up, and initiate a wireless NFC connection.

For example, in the embodiment illustrated in FIG. 1, relative movement of the devices 110, 120 toward one another may induce the Hall effect in a magnetic field sensor incorporated within one or both of the devices 110, 120, and so trigger execution of an NFC query and authorization process and, conditioned upon authorization, establishment of a uni- or bi-directional wireless communication session between the devices 110, 120. In one non-limiting example, one or both of devices 110, 120 is provided with either a magnet 724 or a magnetometer, i.e., a magnet sensor 726, such as a Hall effect sensor or magneto-resistive sensor, or both. The devices 724, 726 may be matched in a single touch or other gesture adapted to bring the devices into suitably close proximity (sometimes termed a "kiss" gesture because the two devices 110, 120 typically touch or "kiss" each other or are very close and in adjacent proximity).

An example of a suitable proximity for such embodiments may be in the range of about 10 to 20 mm, but the range may be more or less depending on the strength of the magnets and the purposes for which the device(s) 110, 120 and/or system 100 is intended. The sensor(s) 726 on each device 110, 120 may be aligned to the magnet on the respective other device, as illustrated in FIG. 1. One or both of the sensors 726 senses ("sees") the corresponding magnet 724 pursuant to the Hall effect, causing a voltage variation or other signal to be generated by the sensor and transmitted to a processor, so as to activate an NFC circuit to communicate with the other device using the protocol of an associated NFC Stack or other wireless communication(s) subsystem or device(s). The devices 110, 120 can then communicate with each other using any NFC protocol suitable for the intended purpose.

Establishment of NFC communications sessions between the devices 110, 120 can be conditioned on suitably-adapted authorizations, using, for example, PIN numbers and/or other security keys.

Interaction between active NFC devices 110, 120 as shown, for example, in FIG. 1, can be considered peer-to-peer NFC interactions.

FIG. 2 illustrates an example of another NFC system 100 suitable for use in implementing various aspects of the disclosure. In the embodiment shown in FIG. 2, system 100 comprises an active NFC device 110, in the form of a smartphone or other wireless handheld or mobile device 120, and a passive NFC device 950 such as an RFID or other NFC tag, which may for example be attached to an NFC poster, or 'smart' poster. Bringing an active NFC-capable device 110, 120 close enough to a passive device 950 such as a tag embedded within or otherwise attached to a poster can cause query, authorization, and/or data transfer processes to fully or semi-automatically execute using magnets, Hall effect sensors, and/or other proximity-detecting mechanisms as described above and elsewhere herein.

A passive NFC device 950 in accordance with the invention can comprise memory(ies), including both volatile and persistent (i.e., non-transient) media for storing data readable by active NFC (i.e., wireless) device(s) 110, 120. Data stored by passive device(s) 950 and read by active device(s) 110, 120 can include any data suitable for desired purpose(s). For example, a passive device 950 affixed town informational document such as an advertising or instructional poster can store, for reading by one or more active device(s) 110, any information desired to be imparted to the device(s) 110 and/or users thereof. For example, a device 950 affixed to an advertising poster can store information related to a product, such as an item of clothing, an entertainment event, or a food product purchasable by a user of a device 110.

Alternatively, or in addition, a device 950 can store data such as a uniform resource locator (URL) or other address information, such as a telephone number, readable by active device(s) 110 and suitable for directing a processor associated with the device(s) 110 to establish one or more uni- or multi-direction communications sessions with commonly-controlled and/or third-party resources via one or more networks 900, as shown in FIGS. 2 and 3.

Such networked resources can, for example, include vendor, enterprise, or other servers, computers, smartphones, etc.

In various aspects and embodiments of systems enabled by the various devices 110, 120, and components 950, etc., described herein, data may be made accessible, by reading, to a wide variety of NFC-capable devices. For example, data may be persistent (non-transiently) stored on any device(s) capable of holding data and making it available to active NFC device(s) 110, 120, etc. Such NFC-readable data storage devices can, for example, include suitably-configured active NFC device(s) 110, 120, and tags any other form(s) of passive NFC device(s) 950.

A somewhat more general embodiment of a system 100 for implementing aspects of the disclosure is shown schematically in FIG. 3. In the embodiment of FIG. 3, an active wireless handheld device 110, 120 is configured for communication with a wide variety of external devices via a number of communications (sub)systems. For example, using an NFC (sub)system 8132, the device 110 is configured to communicate with any one or more of passive NFC device(s) 950, such as RFID or other NFC tags; optionally non-mobile active device(s) 110, such as stationary computers or other devices, including for example vendor point-of-sale transaction devices); and/or NFC-capable mobile devices 120 such as smartphones and/or laptop, palmtop, and/or tablet computers.

As explained further below, the device 110, 120 shown in FIG. 3 is further capable, via wireless communications (sub) system 8101, of communicating with a wide range of devices, including for example server(s) 912 and/or other computers 914 via the internet, the public switched telephone network (PSTN) and/or other wired wide-area or local-area public or private network(s) 900, and/or one or more smartphones, computers 914, servers 912, and other active systems 110 via cellular and/or other wireless telephone networks. For example, an active NFC device 110, 120 may be communicatively coupled to one or more wireless local area networks (WLANs), such as a Wireless Fidelity (WiFi) network, or a wireless wide area network (WWAN) such as 3GPP or 4G Long Term Evolution (LTE) network (not shown). By way of non-limiting example, and as will be appreciated by those skilled in the relevant arts, WiFi is typically deployed as a WLAN that may extend home and business networks to wireless medium and may follow an IEEE 802.11 or other standard. A wireless communications connection may also be established using, for example, short-range communications subsystems which may include an infrared device and associated circuits and components as described above, or a Bluetooth communications module, to provide for communication with similarly-enabled systems and devices as well as the NFC communications.

FIG. 3 shows a non-limiting example of a range of various functional components that may be included in an exemplary handheld or other mobile wireless communications device 120. In the example shown, device 110, 120 includes, among other components, housing(s) 8120; input device(s) such as keypad(s) 8140, touchpads 8141/740, microphone(s) 8112, accelerometer(s) 8137, analog/digital (a/d) converter(s) 8138, touchscreen display(s) 8160, hall effect or other field/proximity sensor(s) 8134, 726, gyroscope(s) 8240, global positioning system(s) (GPS(s)) 8242, and optical or image reader(s) 8246, such as one or more digital still and video cameras and/or barcode readers, quick response (OR) readers, or other scanners; output device(s) such as touchscreen or other display(s) 8160, speakers(s) 8110, and magnet(s) or other field/proximity generator(s) 8135, 724; and input/output (I/O) device(s) such as uniform serial bus (USB) auxiliary input/output port(s) 8106, parallel or serial port(s) 8108, NFC (sub)system(s) 8132, including Bluetooth and/or other short-range communication (sub)system(s), and wireless/radio transceiver (sub)system(s) 8101.

As will occur to those skilled in the relevant arts, device(s) 110, 120 may include any of a wide variety of these and other components and (sub)systems, in any desired combination(s); and they may interact in any of a wide variety of ways, in addition to those described herein.

As will further be understood by those skilled in the relevant arts, handheld device(s) 120 can comprise any of a very wide range of mobile devices, including for example cell-phones, smartphones, and other radio-based communications devices, as well as laptop, palmtop, and tablet computers. "Handheld" means portable and operable using one or both hands; and, in the case of smart phones, can but does not necessarily mean devices that are roughly the size of an average human palm.

One or more processors 8180, 8158, 8138, 8132(*a*), etc., working singly or in any desirable or otherwise suitable combinations, can use inputs generated and/or otherwise provided by any one or more of the various input device(s) input device(s) 8140, 8141/740, 8112, 8137, 8138, 8160, 8134/726, 8240, 8242, 8246, 8106, 8108, 8132, 8101 and locally and/or remotely-accessible peripheral devices, such as printers, servers, telephones, computers, etc., to generate, according to suitably-configured logic rules, output signals suitable for processing by any one or more of the various output device(s) 8160, 8110, 8135/724, 8106, 8108, 8132, 8101, and locally and/or remotely-accessible peripheral devices, etc.

Any or all of processor(s) 8180, 8158, 8138, 8132(*a*), etc., along with any other desired components and/or (sub)systems incorporated, by a device 120 may be protectively and/or functionally contained within housing 8120(*s*) coupled, as for example by means of suitably-configured buses, etc., between the various memory, input, output, and auxiliary devices (such as battery(ies), solar power generators, etc) in order to perform the functions disclosed herein. Processor(s) 8180, 8158, 8138, 8132(*a*) may be of any suitable form(s). For example, CPU(s) 8180 may comprise one or more microprocessors chip contained on or otherwise attached to one or more circuit boards within housing(s) 8120. CPU(s) 8180 can provide general command and control functions including, for example, operation of the display 8160, as well as the overall operation of the mobile device 810, in response to received information and inputs, such as in response to actuation of keys on the keypad 8140 by the user. Processors, 8158, 8138, 8132(*a*), etc., may be provided to control specialized functions such as operation of NFC and other particular communications channels.

Logic rules suitable for use by processors 8180, 8158, 8138, 8132(*a*) in generating such outputs can be accessed from any suitable locally and/or remotely located source(s), including, for example, any one or more applications modules 8130A-N, 8244, 8248, etc., as, for example, explained herein.

Such rules and modules can be provided in any form(s) suitable for achieving the purposes addressed herein, including for example software instructions stored in transient (volatile) and/or non-transient (persistent) memory, firmware, and hard-programmed hardware device(s) or component(s).

Memory(ies) 8118, 8116, etc., which can be of any form compatible with the purposes disclosed herein, including, for example, flash, EEPROM, RAM, ROM, disk, register, etc., can be accessed, controlled, and otherwise used 8180, 8158, 8138, 8132(*a*), etc., for reading data used in the various processes described herein, for storing output so generated, and for holding executable forms of suitably-configured application and/or module instruction sets. Such stored data may, for example include operating system and other software executed by the processing device 8180.

As shown in FIG. 3, an active device 110 can comprise multiple communications abilities, and thus may have the ability to conduct concurrent communications sessions with other devices 110, 950, 912, 914, etc., using NFC, voice, and/or other communication means. For example, as illustrated, NFC capable device 110 may be engaged in peer-to-peer communication with a second NFC capable device 110, while also communicating with a baseband access point 912, 914, which may take the form of a cellular base station, for example.

Long-range (e.g., cellular) voice and/or text communications processes may be provided for an active device 110,120 by one or more wireless communications subsystems 8101, comprising transmitter(s) 8152, 8156, receiver(s) 8150, 8154, and digital signal processor(s) (DSP(s)) 8158.

Short-range communications may be provided by either or both of NFC subsystem(s) 8102, 8132, which may or may comprise dedicated antenna systems for short-range aspects; specialized memory device(s) 8116, 8118, and other device subsystems 8121.

Mobile device(s) 110, 120 in accordance with the disclosure may therefore be considered, in the examples shown, example, two-way RF communications devices having voice and data communications capabilities using RF circuitry. In addition, the mobile device 110, 120 may have the capability to communicate with other computer systems 110, 912, 914, etc., via the Internet or other network(s) 900. For example, a device 110, 120 may communicate with one or more servers 912, such as Internet servers, via RF subsystems 8101 and the associated components, including web module 8130*e*, and further via short-range communications subsystem(s) 8102, such as via web/browser module(s) 8130*e*. System(s) 8102 may include, for example, one or more Bluetooth communications modules for establishing Bluetooth wireless connection(s), and other communications modules, such as infrared modules or devices, WiFi circuits and modules, and associated components and circuits that may also form part of the RF circuitry.

A predetermined set of applications that control basic and optional device operations, such as data and voice communications 8130A and 8130B, may be installed on the device 110, 120 during manufacture. Application modules 8130A-N may include native and non-native modules for security 8130D, Web interaction 8130E, social interactions or applications, and the like.

NFC communications module(s) 8130C may include hardware and/or software to enable NFC controller(s) 8132A (which may themselves include hardware, software, and firmware a required) and with the microprocessor 8180, to perform NFC communications tasks, such as through the memory 8116, NFC communications module(s) 8130C may, in various embodiments, support responsive operability for tag 950 reads/writes, whether virtual or physical, by interacting with other modules and apps to affect data stored on tag(s) 950, and/or to obtain or write tag data. Such other modules may for example include web module 8130E, PIM module 8130F, and other software modules 8130N (such as apps and video players, by way of non-limiting examples). Microprocessor(s) 8180 may also cooperate with NFC module(s) 8130C, and with NFC subsystem(s) 8132, which may include one or more NFC chips comprising NFC controller(s) 8132a, and antenna(s) 8132b to facilitate communications with other active and/or inactive NFC device(s) 110, 950, as discussed herein. For example, an NFC communications module 8130C may allow a microprocessor 8180 to control the NFC subsystem 8132 and/or memory stores 8116, 8118.

An example of a NFC communication between devices 110, 120 is shown in FIG. 1a, where the respective NFC antenna 8132b (not shown in FIG. 1a) is placed at the rear side of the respective device 110, 120. The NFC communication may be established between devices 110, 120 when the devices are brought in close proximity to one another, back-to-back, or touching, back-to-back. Alternatively, or in addition to positioning the devices 110, 120 is close proximity back-to-back, where the respective NFC antenna 8132b of each device, or an additional NFC antenna 8132b is positioned on a front, top, or bottom of each device 110, 120, the devices 110, 120 may be brought close together or touch one another at the respective side or face of the device 110, 120 to establish NFC communication between the devices 110, 120. NFC chips suitable for use in implementing aspects of the disclosure may, for example, comprise one or more PN531 microcontroller-based transmission modules produced by Koninklijke Phillips Electronics N.V. Such NFC chips 8132a may, for example, include both digital and analog circuitry, and one or more contactless Universal Asynchronous Receiver Transmitters (UARTs), cores, and host interfaces. Incorporated circuitry may include output drivers, integrated demodulators, bit decoders, mode detectors and RF-, magnetic, and/or level detectors as suitable. Suitable contactless UARTs may include elements for data processing, Cyclical Redundancy Checking (CRC), parity generation, framing generation and check bit coding and decoding, and/or other functions. Cores may, for example, include one or more 80C51 microcontroller, 32 Kbytes or other amounts of ROM and, one Kbyte or other amounts of RAM, for example. A set of host interfaces may interface with the microprocessor and interface according to such known standards as 12C, serial UART, SPI and USB. NFC circuits may be tuned to any frequency(ies) suitable for accomplishing the purposes disclosed herein, as for example about 13.56 MHz.

NFC (sub)system(s) 8132 may include and/or otherwise cooperate with one or more magnets/magnetometers or other magnet sensors 8134, such as Hall effect sensors, communicatively connected to the microprocessor 8180, 8132a. Sensor(s) 8134 may include components suitable for operation as a Hall effect sensor, including any necessary coils or other circuits. There is also illustrated a magnet/magnetometer 8135 that, in various embodiments, may be advantageously be provided in the form of one or more electromagnets and may operates with microprocessor(s) 8180, 8132a, etc., to allow one or more alternate communications pathways using electromagnetic energy, which may be changed to correspond to changing data. Electromagnet(s) 8135 may perform a variety of different functions, including working as an active or passive device in association with other components of the device 110. For example, when an electromagnet 8135 is used instead of a permanent magnet (non-electromagnetic) in the devices of FIG. 3, a pulse of energy may be delivered to the Hall effect sensor in another device. The other device receiving the pulse may accordingly activate its NFC circuit. A WiFi connection, for example, in the alternative may be established if an NFC and/or Bluetooth connection is not established. Other modules 8130N may include, for example, software that interoperates with the magnetic sensor 8134 and any magnet or electromagnet 8135 or other magnetic circuitry that may be included within the overall electromagnet 8135.

In addition, personal information manager (PIM) application module(s) 8130F may be or include one or more native modules installed during manufacture. PIM(s) 8130F may be capable of organizing and managing data items, such as email, contacts, calendar events, voice mails, appointments, and task items. The PIM application is also capable of sending and receiving data items via a wireless network. The PIM data items are seamlessly integrated, synchronized and updated via the wireless network with the device user's corresponding data items, such as may be stored in the cloud or as may be associated with a host computer system, for example.

Communication functions, including data and voice communications, may be performed through the communications subsystem 8101, and/or through the short-range communications subsystem 8102, which may be part of the circuitry contained in device 810. The specific design and implementation of the communications subsystems 8101 and 8102 may be dependent upon the communications network in which the mobile device 810 is intended to operate.

Such communication functions may, as referenced above, be carried out by data module 8130B, voice module 8130A, and web module 8130D, including at the instruction of NFC module 8130C in accordance with the disclosed embodiments, with security for these communications, such as in the granting of access to PIM module 8130F, overseen by a security module 8130D. A security module 8130D may include one or more native or non-native security applications, including anti-virus/anti-malware applications or functions, and protection of PIM information via applications or functions, during external interactions, may occur via NFC or via the Web, for example. Accordingly, security module 8130D may allow for degrees of security in interacting with other devices, such as the aforementioned tags, and/or other devices such as servers (herein defined to include any device acting as an Internet, intranet, extranet, or other public or private network node, host, server, or the like), and particularly with devices or aspects of a device that enable the occurrence of communication exchanges by the device occur over a network, such as the Internet.

As previously noted, NFC processes may be conducted according to any of a wide variety of wireless, short-range communications protocols. Such protocols typically comprise sets of standards to enable devices 110, 120, such as smartphones and the like, to establish radio communication with each other by bringing them into close proximity, or by touching them together. Applications include wireless data transactions and simplified setup of communication sessions involving other communication technologies, such as Wi-Fi and Bluetooth. Communication is also possible between a powered NFC device and a powered or unpowered NFC "tag" or button. Suitable standard currently in use are have been p promulgated by the NFC Forum, which was founded in 2004 by Nokia, Philips and Sony, and which now has more than 160 members. The NFC Forum also promotes NFC and certifies device compliance.

Standards have been developed that cover both NFC Forum sanctioned communication protocols and other short-range wireless data exchange (NFC) formats. Specifically, an example of NFC standards ISO/IEC 18092/ECMA-340;

Near Field Communication Interface and Protocol-1 (NFCIP-1); ISO/IEC 21481/ECMA-352; and Near Field Communication Interface and Protocol-2 (NFCIP-2). NFC also encompasses a variety of pre-existing standards including ISO/IEC 14443 both Type A and Type B, and FeliCa. The standards specify the NFC air interface, modulation schemes, coding, transfer speeds, and frame format of the RF interface of NFC devices. The standards also comprise initialization schemes and conditions required for data collision-control during initialization for both active and passive NFC modes. In addition, they define a transport protocol, including protocol activation and data-exchange methods.

NFC protocols sanctioned by the NFC forum typically operate within a globally available and unregulated radio frequency band of 13.56 MHz, and generally have a working distance of up to about 20 centimeters. Three data rates are currently defined in the NFC standards: 106 kilobits per second (kbit/s); 212 kbit/s; and 424 kbit/s.

In addition, the NFC Forum has defined a common data format called NFC Data Exchange Format (NDEF), which can store and transport various kinds of items, such as MIME-typed objects and URLs. The NFC Forum also added the Simple NDEF Exchange Protocol for sending and receiving messages between two NFC-capable devices.

All of the above-mentioned standards and formats, along with any other existing and applicable NFC standards, are incorporated herein by reference as if fully set forth in their entirety, in their finalized condition.

Both passive and active communications modes have been defined. In active communication modes, both an initiator device and a Target device may generate their own NFC fields 1000 (see e.g., FIGS. 1 and 2). The initiator device may start the NFC communication, with the target device responding to commands received from the initiator device, as appropriate, by modulating the NFC field 1000 generated by the Target device.

Between two active NFC devices 110, either or both devices can act as either initiator or target. In passive communication mode, one of the devices lacks, or does not employ an ability to independently create an electro-magnetic NFC carrier field 1000, and therefore generally does not serve as an initiator.

As previously noted, among the many uses to which NFC systems and devices, and related methods, can be put is the control of handheld and other mobile communication and computer systems, including for example device(s) 110, 120.

As noted above, passive and other NFC-readable data storage devices such as tag(s) 950 may be attached to or otherwise disposed upon any surface(s) or object(s). When an active NFC-capable mobile device 110, 120 is brought within sufficiently close range of a passive NFC device 950, the active NFC device 110 may read from the passive device 950 data which directs the NFC-capable mobile device 110, 120 to execute one or more instructions or commands in order to control one or more aspects of the operation of the device 110, 120. For example, an NFC device 950 located in a particular environment, such as an office, or an automobile, may store data useful for directing a device 110, 120 to activate a mode of operation appropriate or designated for that respective environment. For example, one or more machine-executable control commands, or instructions, may be stored on the device 950, and/or the device 950 may provide address information useful for directing the device 110, 120 to a networked resource 912, 914, etc., associated with such commands.

In addition to reading data from a passive device 950, NFC subsystem 8132 of NFC-capable mobile device 110, 120 may also be affected by NFC signal loads or NFC signal shielding when a load object 32 ("load object") is placed proximate antenna 8132*b* of NFC subsystem 8132. Such load object 32, despite not being configured to transmit any data by NFC communications, may exert a load that is detected by the NFC subsystem 8132. In some embodiments, load object 32 may, for example, be configured to induce an electromagnetic saturation, or other NFC signal saturation, detectable by NFC subsystem 8132. The load may originate from load object 32 or may originate from another source that is reflected or otherwise transmitted by the load object 32. The load may be magnetic or electromagnetic, or any other load signal detectable by the NFC subsystem 8132. As a detectable input, loads may be used to trigger functions of the NFC-capable mobile device 110, 120. A load associated with the load object 32 may arise from the load object 32 reflecting signals towards the NFC subsystem 8132, optionally saturating the NFC subsystem 8132 using the reflected NFC signals. Accordingly, a load may be referred to as a shielding load, and the load object 32 may be also referred to as a shielding load object. The effect of a load upon the NFC subsystem 8132 may be that the NFC antenna 8132*b* or the NFC subsystem 8132, or some element thereof, becomes short circuited when detected by the load. This act of short circuiting may also be detected by the NFC subsystem 8132 as recognizing that a load object 32 is present.

Device 110, 120 may be configured to associate particular load intensities, optionally measured to be substantially constant over a predetermined time, with the existence of a particular type of surface associated with a particular object being proximate the NFC-capable mobile device 110, 120. For example, as shown in FIG. 5, a particular load object 32 such as a metallic plate, ferrite, or other ferrous material may be included in a holster or other covering 10 for mobile devices, the covering 10 having surface 30. Such metallic members or ferrites may have particular load profiles known to the NFC-capable mobile device 110, 120 that differ from other metallic objects, such as metallic tables, metallic walls, or other metallic surfaces. The NFC-capable mobile device 110, 120 may be configured to determine whether a particular load detected by the NFC subsystem 8132 is caused due to a surface associated with a holster, case, or other covering, or a charging surface, or other surface intended for use to control the NFC-capable mobile device 110, 120, and not other metallic objects. Accordingly, the load object 32 may cause a load of a known profile to be detected or measured by NFC subsystem 8132. For example, the load may be compared against a predetermined load threshold or load intensity range by the NFC subsystem 8132 or processor of device 110, 120. In various embodiments, by polling for NFC communications, the NFC subsystem 8132 is polling or transmitting NFC signals in an omni-directional, or directional manner. When load object 32 is moved proximate the NFC subsystem 8132 or NFC antenna 8132*b* (or vice versa), the transmitted signals from the NFC subsystem 8132 may be redirected by the load object 32 back to the NFC subsystem 8132. The redirected signals may be measured by the NFC subsystem 8132 or may saturate the NFC subsystem 8132 or NFC antenna 8132*b* entirely. In any of these cases, the detected signals at the NFC subsystem 8132 may be compared against known profiles of load objects 32 in response to polling by the NFC subsystem 8132 in order to determine whether a load object 32 specific for use with the present invention is present.

In some non-limiting exemplary implementations, the NFC subsystem 8132 may be configured to operate in one of various power modes of operation, for example, either a high-power, normal-power, or low-power mode. The NFC subsystem 8132 may be configured to detect a load object 32 as described herein while operating in any of these modes. In particular, the NFC subsystem 8132 may detect a load associated with load object 32 while operating in a low-power mode, or a low-power tag detect mode. As the NFC subsystem 8132 does not necessarily need to receive a NFC data transmission from load object 32, but rather only detect the load associated with the load object 32, it may be possible to operate the NFC subsystem 8132 in a low-power mode in order to detect the load.

Figure 4B:
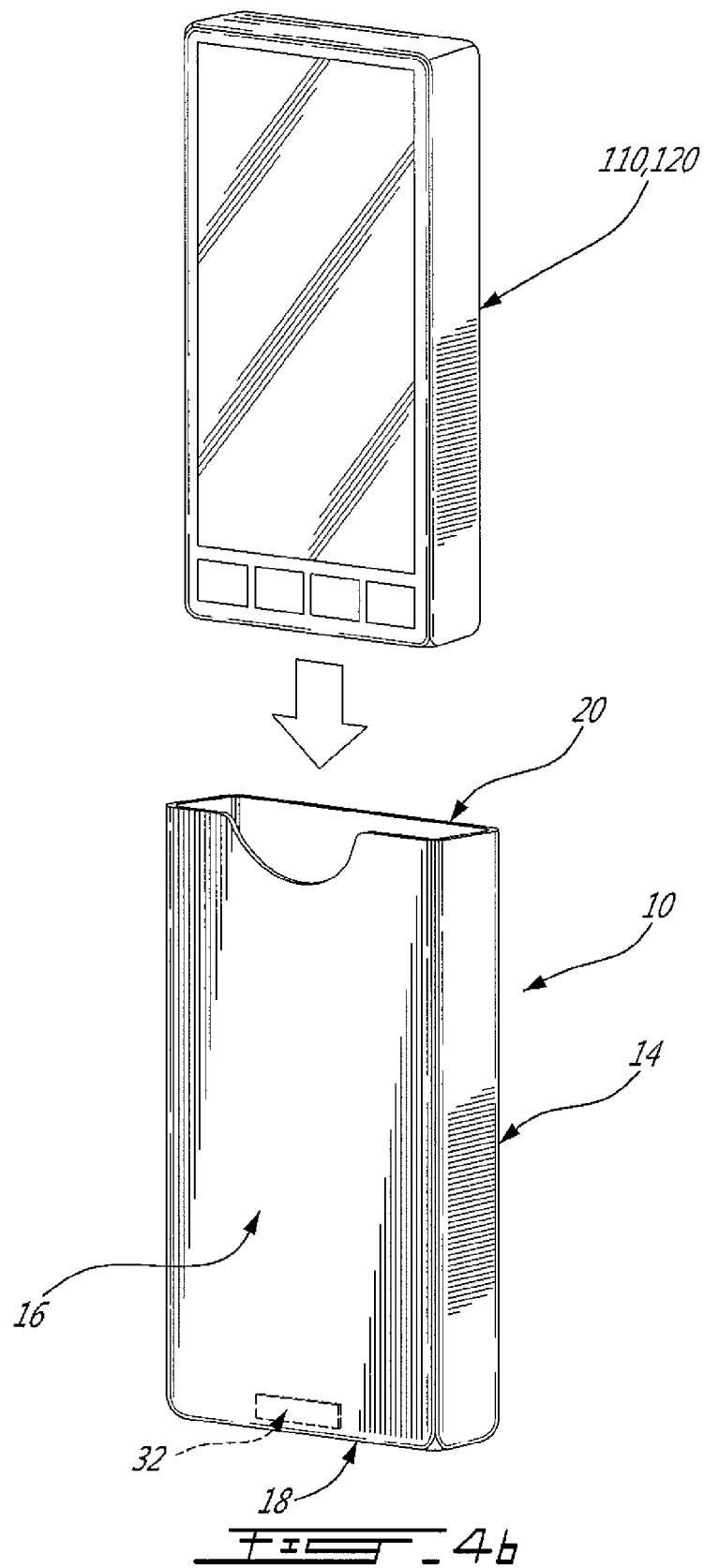

As a further particular example, and an example which can be of significant advantage for a wide number of reasons and in a wide number of circumstances, a mobile device 110, 120 may be stored in a covering 10, such as a holster, case, sheath, or other protector, as shown in FIGS. 4a and 4b. For use, the device 110, 120 may be removed from the covering 10, used for any of the wide variety of purposes enabled by the various systems, subsystems, and components described above, and then placed back into or within other close proximity to the covering 10 when the device 110, 120 is no longer actively being used. In accordance with the present disclosure, one or more load objects 32 may be embedded within, or otherwise attached to, covering 10 to be detected by device 110, 120 when the device 110, 120 is placed within the covering or otherwise brought into sufficiently close proximity to it. Preferably the load object 32 is positioned in the covering 10 such that the device 110, 120 detects the presence of the load object 32 upon being sufficiently positioned in the covering such that image reader 8246 (or camera) of device 110, 120 is proximate surface 30 of covering 10 to take a photo of the surface 30 in order to capture a visual image (or photo) of a visual characteristic 34 on the surface 30. The characteristic 34 may therefore be detectable by the camera 8246. While the existence of load object(s) 32 may trigger device 110, 120 to operate camera 8246, it is an identification of the visual characteristic 34 that may allow the device 110, 120 to identify the surface 30 and operate accordingly.

The photo taken by camera 8246 is compared by device 110, 120 against image data associated with known surfaces. A determined correspondence may result in the device 110, 120 being configured to execute a particular device control command. A wide variety of such commands may be implemented. For example, based on determination that the device 110, 120 is proximate a particular surface, or covered by a particular covering 10, the device's processors 8180, etc., may be caused to cause various systems, subsystems, or components of the device 110, 120, to be provided with altered power settings, or otherwise subjected to altered operating conditions. For example, one or more antennas, displays, speakers, or other input and/or output devices of an NFC (sub)system 8102, 8132 may be powered down, or off, or may be placed into any other desired operating condition(s).

Figure 7:
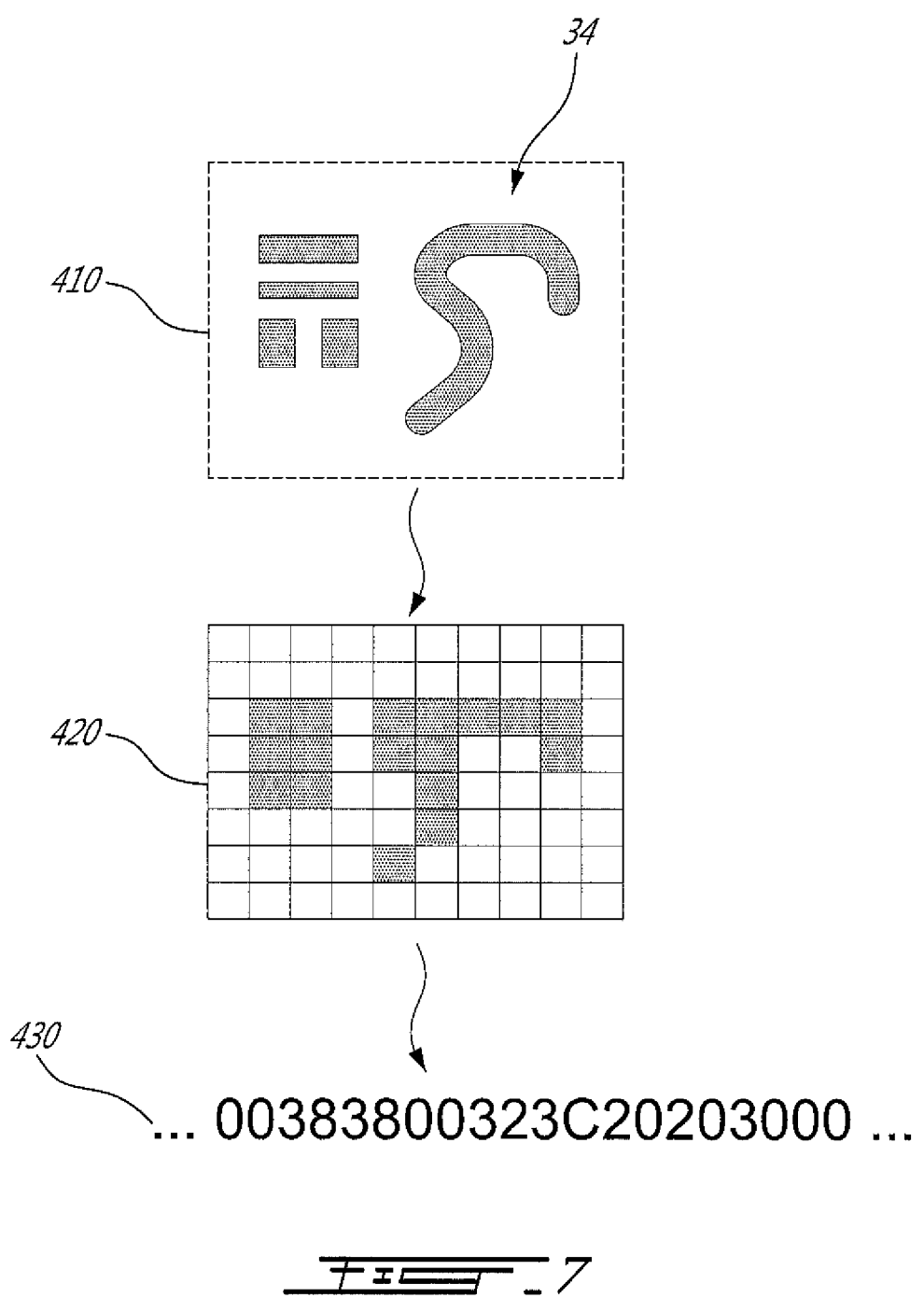
FIG. 7 an exemplary diagram of visual characteristic identification useful in implementing various aspects of the disclosure.

FIG. 7 shows an exemplary, non-limiting representation of a photo 410 of a visual characteristic 34, and image data 430 extracted from the photo 410. In order to extract the image data 430, data 420 may be generated from analysis by device 110, 120 of photo 410 to determine data points of interest in the visual characteristic 34. Those data points may then be converted to data values and compared against similarly stored image data. Data 420 may be therefore contain approximations of information stored in photo 410, in particular where the device 110, 120 discerns the photo 410 as comprising an approximate grid-based pattern, where shaded grid elements in data 420 represent likely occurrence of pattern elements. For example, if the shaded portions of photo 410 represent reflective elements on a relatively unreflective background, then the shaded portions of photo 410 represent areas of relatively high reflection as discerned by the camera 8246. By adjusting the grid resolution, the fidelity of the grid-based pattern discerned from the data 420 can be adjusted. The camera 8246 may represent the discerned pattern as a digital signal 430. For illustration, the digital signal 430 is shown as containing a hexadecimal representation of the grid-based pattern.

As will be appreciated by those skilled in the relevant arts, any desired commands) may be executed, based wholly or partially on such an identification of surface 30. For example, in addition to powering up or powering down various (sub) systems or components of a device 110, 120, executed commands may be used to alter alert, communications, or other states of the device, so as for example to put a device into any desired 'sleep' mode, which mode(s) may be associated uniquely with a home, office, or other location, time of day, day of week, and/or any other condition.

As will be further understood by those skilled in the relevant arts, once they have been made familiar with this disclosure, command(s) executed by a device 110, 120 upon placement proximate surface 30 comprising embedded or otherwise attached load object 32 may be fully or partially configurable by a user of the device, and/or by any other authorized persons, including for example managers, IT personnel, and other administrators. For example, by accessing a configuration application on a mobile device 110, 120 and/or a desktop or other computer, a user of an NFC-capable device 110, 120 can configure recognition of surface 30 to cause the device 110, 120 to execute any desired action(s) on insertion into a covering 10 or placement proximate surface 30.

Non-limiting examples of commands executed based on the identity of surface 30 may include reducing and/or otherwise modifying power supplied to one or more hardware components of the device 110, 120, such as receivers 8154, or transmitters 8156, or any antenna component of the device 110, 120. Similarly, a hardware component of the device 110, 120 (such as an antenna 8154, 8156, speaker 8110, light, or display screen 8160) may be disabled entirely or partially, or designated not to be used, or the device 110, 120 may enter a predefined reduced-power state, such as a "standby" mode.

Optionally, a plurality of load objects 32 may be attached to or form at least part of surface 30 or covering 10 such that detection of each load object 32 in a timed succession, or simultaneously by multiple NFC antennas of device 110, 120 may result in the device 110, 120 determining an upwards/downwards orientation of device 110, 120 with respect to surface 30 or covering 10. The executed device control command may also be selected or modified by determining the device 110, 120 is oriented in a particular direction. For example, indicator lights at a top end of device 110, 120 may be disabled if the device 110, 120 determines that it is facing downwards in a particular covering 10 that is known to the device 110, 120 to have a closed bottom, and closed front and rear surfaces.

As mentioned, commands executed by a device 110, 120 may, among other possibilities, be configured to control heat distribution within the device 110, 120. This may be possible through the use of a heat dissipation system 8340 of the device 110, 120. Heat dissipation system 8340 may comprise at least one top heat pump disposed proximate a top end of the device 110, 120 and at least one bottom heat pump disposed proximate a bottom end of the device 110, 120. In operation, upon determining the orientation of the device 110, 120 within the covering, one of the top heat pump and bottom heat pump located at an opening of the covering 10 as determined by detections of the load object(s) 32 and an identification of the covering 10 may be operated to dissipate heat away from the device 110, 120 at the opening of the covering 10. Dissipating heat from device 110, 120 away from the user may be preferable, for example, with respect to the comfort of the user, and also to dissipate heat from the device 110, 120 more efficiently, as air around the device 110, 120 may be more effective at dissipating heat from the device 110, 120 than the closed end of the covering 10.

The visual characteristic 34 on the surface 30 may be attached to or formed into the covering 10 through bevelling or embossing. Each visual characteristic 34 may be attached to a surface of the covering 10 by adhesive or other mechanism of non-permanent or permanent attachment. Accordingly, visual characteristic 34 may be repositionable on surface 30. In particular where the covering 10 has front and rear walls surrounding front and rear sides of device 110, 120, then the visual characteristic may be tiled or otherwise repeated along an interior surface, or portion, of covering 10, or simply located at possible locations on the interior surface where it is expected the camera 8246 of the device 110, 120 will be located. An example of a repeated visual characteristic 34 is shown in FIG. 8. Visual characteristic 34 may comprise a suitable pattern detectable via the camera 8246 of the device 110, 120. Alternatively or in addition, visual characteristic 34 may comprise a (e.g., substantially uniform) area of a particular color permitting the identity of surface 30 to be determined based on color.

With respect to a covering 10, in various embodiments, at least one load object 32 is placed in a location proximate an end or edge 18, 20, etc., of the covering 10. For example, one load object 32 may be placed near an entry opening or top 20 of the covering, or at an opposite location thereto, such as at the bottom 18 of the covering 10, Each load object 32 may be attached to an inner surface or outer surface of the covering 10 and/or may be embedded within the covering 10, as for example by molding, sewing within a seam or between layers of leather or other material, etc.

Where the surface 30 having the visual characteristic 34 is not a covering 10, but rather a surface 30 which may be a charging surface of a charging device, such as a wireless induction charger, cradle, or stand, the visual characteristic 34 may be repeated over substantially the entirety of the surface area of the surface 30 where the device 110, 120 can be expected to be placed. For example, in the case of a wireless charger having a top surface, the visual characteristic 34 may appear over the entire top surface of the wireless charger. In the case of a cradle, the visual characteristic 34 may only appear on portions of the cradle that would be proximate the device 110, 120, or proximate the camera 8246 of the device 110, 120 when the device 110, 120 is mated with the cradle in operation.

As described previously, an NFC subsystem 8132 may include one or more NFC antenna(s) 8132b. Each NFC antenna 8132b may be attached to the device 110, 120 housing 8120 or otherwise disposed inside or outside the housing 8120. Each antenna 8132b may be positioned at generally specific locations of the housing 8120, or may be disposed along all or part of a surface or side of the housing 8120. One or more antenna(s) 8132b may be used to detect the presence of one or more load objects 32. In embodiments in which an antenna 8132b is located at, or proximate to, a particular location of the housing, it is commonly preferable that that location or portion of the housing 8120 be positioned near load object 32 to facilitate detection of the load object 32. Where an antenna 8132b extends along a length of a side of the housing 8120, the antenna 8132b may detect load object 32 where any part of the housing 8120 is positioned near the load object 32. Each antenna 8132b may be capable of detecting a respective nearby load object 32 independently of any other antenna 8132b.

As shown for example in FIG. 5, some or all components of NFC (sub)system(s) 8132 of a device 110, 120 and particularly any antenna(s) 8132b thereof, may typically be positioned on one side of a battery of the device 110, 120, optionally proximate a rear side of housing 8120. In such circumstances the battery and/or related battery components, and/or other non-battery components may act as shielding by, for example, deflecting, reducing or effectively blocking electromagnetic fields or radiation or other NFC-detectable signals produced by the antenna(s) 8132b from emanating through or toward the front 8320 of the device 110, 120, and instead radiate, extend, or otherwise emanate from a rear 8310 of the device 110, 120. Dedicated, special-purpose, and/or other shielding 8330 may also, or alternatively, be provided, or otherwise exist, within a device 110, 120. Shielding 8330 may comprise any suitable material(s) of any suitable shape(s), disposed in any configuration(s) suitable for attenuating, blocking, or otherwise affecting NFC and/or other communication signals generated by NFC (sub)system(s) 8132. Shielding 8330 may also comprise more than one distinct shielding element not necessarily all connected to one another. Shielding 8330 may comprise a ferrite, metallic ferrous, or other electromagnetic interference ("EMI") or radio-frequency interference ("RFI") shielding material. The device 110, 120 may be configured to identify the different load profile of the battery or shielding 8330 providing a load on NFC subsystem 8132 from the load profile of a load object 32. This may be achieved by using particular known materials, dimensions, and placements of load objects 32. In this way, false positive detection of other metallic surfaces, such as metal tables, or metal walls, may also be determined and disregarded as the load from such another metallic surface may not correspond to the known constant load of the load object(s) 32 employed for the purposes of the present invention.

The device 110, 120 may store the image data of a plurality of surfaces 30 (e.g., visual characteristics 34), and therefore the device 110, 120 may be capable of identifying many different surfaces 30 and types of surfaces. The device 110, 120 may associate, through any of the methods of configuration described herein, any surface 30 with a particular object or type of object. The device 110, 120 may then be configured to change a mode of operation, generally by executing a device control command, when detecting that a particular object or type of object is proximate to the device 110, 120 in accordance with aspects of the invention. For example, the device 110, 120 may be configured to execute commands specific to being placed on or near a car dashboard, on or near an office desk, on or near a bedroom end table, or in a variety of bags, purses, coverings, cases, and holsters, or on any other surface associated with any other kind of object. For example, when the device 110, 120 detects that it is proximate a vehicle dashboard, or holstered or covered in a holster or covering associated with a car or other vehicle, the device 110, 120 may be configured to execute a device control command that triggers operation of GPS functionality of the device 110, 120. Subsequent removal of the device 110, 120 from the dashboard, holster, or other covering, may result in the device 110, 120 executing a device control command to close, minimize, suspend, or otherwise change operation of the GPS functionality of the device 110, 120.

The device 110, 120 may maintain a whitelist of known surfaces 30 or associated objects or object types such that when any such surface 30 in the whitelist is identified, the device 110, 120 may execute the associated device control command. For known surfaces 30 not listed in the whitelist, the device 110, 120 may be configured to not execute the device control command, or to execute another device control command associated generally with known surfaces 30 that are not listed in the whitelist. For example, the device 110, 120 may notify the user audibly or visually at the time or some later time, that a known surface 30 not on the whitelist was detected. The device 110, 120 may then prompt the user to add the non-whitelisted surface 30 to the whitelist, or to not notify the user again. Similarly, the device 110, 120 may maintain a blacklist of known surfaces 30 such that an identification of any known surface 30 not on the blacklist will result in the device 110, 120 executing the associated device control command. However, identification of a known surface 30 that is on the blacklist may result in the device 110, 120 not executing any device control command associated with the blacklisted surface 30, or the device 110, 120 may execute another device control command associated generally with known surfaces 30 that are listed on the blacklist.

The visual characteristics of known surfaces 30 may be stored in the device 110, 120 as image data. The image data may be derived from the visual characteristics by identifying particular points, pixels, or arrangements of image data. The visual characteristic 34 may be an opaque object, which may be configured to reflect light in one or more spectral ranges. For example, visual characteristic 34 may be infrared reflectors or reflectors of visible light. Appropriate positioning of the characteristic may include placing the characteristic within the field of view of the camera 8246 and at an appropriate distance therefrom. The visual characteristic 34 is preferably sized appropriately such that at least one instance of the visual characteristic may fit substantially within the field of view of the camera 8246. This facilitates discernment of the characteristic by the device 110, 120 by allowing the entire characteristic to be presented at a single time.

In accordance with some non-limiting exemplary implementations, the visual characteristic 34 may be repeated, for example by tiling the characteristic 34 over a region of surface 30. The visual characteristic 34 (e.g., pattern) may be repeated with or without overlaps or gaps between instances. Thus, the visual characteristic 34 may be presented to the camera 8246 whenever a portion of the region is presented to the camera 8246. Where the visual characteristic 34 is both tiled and sized such that more than one iteration of the visual characteristic 34 occurs in the field of view of camera 8246, presentation of the visual characteristic 34 to the camera can be made robust to alignment errors, since at least one copy of the visual characteristic 34 is presented to the input module regardless what portion of the region is within the field of view of the camera 8246.

As an illustrative non-limiting example, if the visual characteristic 34 is repeated an integer number of times horizontally and vertically in a rectangular field of view of camera 8246, the device 110, 120 may consider the field of view as a torus, with the top and bottom edges of the field of view "stitched" together and the right and left edges also stitched together. The visual characteristic 34 may then be detected if it appears anywhere on the torus.

In some exemplary, non-limiting implementations, the visual characteristic 34 is configured to be presented to the camera 8246 dynamically. For example, the characteristic 34 may be placed on the surface of a holster, with different portions of the visual characteristic 34 being presented to the camera 8246 as the mobile device is slid in or out of the holster. In these implementations, a load object 32 would be attached to the holster near the insertion point, and also at a location of the holster indicative of full insertion of device 110, 120 into the holster. In this way, detection by the NFC subsystem 8132 of each load object 32 would trigger operation of camera 8246. The mobile device 110, 120 may thus be configured to detect full insertion into the holster when the entire visual characteristic 34 revealed in one or both of an appropriate sequence, or to detect partial insertion into the holster when a portion of the characteristic (e.g., a sub-pattern) is revealed due to the sliding motion.

In some exemplary non-limiting implementations, different visual characteristics 34 may be placed at different locations on a holster surface or other surface. The different visual characteristics 34 may or may not be regarded as parts of a larger visual characteristic 34. Different characteristics 34 may be located in different areas of a holster so that a different characteristic 34 is presented to the input module for each of a plurality of levels of insertion of the mobile device into the holster. For example, when a mobile device is inserted half way into the holster, a first characteristic may be presented, triggering a first response, and when the mobile device is inserted fully into the holster, a second characteristic may be presented, triggering a second response.

As another example, the visual characteristic 34 may comprise active elements configured to change the visual appearance of the visual characteristic 34 over time, and therefore change the identification of the visual characteristic 34 by the device 110, 120, triggering the device to perform a device control command associated with the changed visual characteristic 34. Such time variation may comprise or be applied to part or all of the visual characteristic 34.

Embodiments of the present technology may be configured to equate detection of a predetermined class of characteristics/patterns with detection of a predetermined "seed" pattern. For example, the seed pattern may be tiled over a region, and detection of the predetermined class may correspond to detection of a portion of the tiled region which is adequate enough to contain substantially all portions of the seed pattern. The pattern class may include instances where substantially all portions of the seed pattern are present in an intact copy of the pattern. The pattern class may include instances where substantially all portions of the seed pattern are present but in different tiled copies of the pattern. The pattern class may include instances corresponding to different horizontal or vertical displacements or both of the pattern or portions thereof. Thus, embodiments of the present technology may be configured to detect a pattern in a tiling, regardless of how the tiling is displaced horizontally or vertically or both in the field of view. Patterns in the predetermined class may additionally or alternatively correspond to the "seed" pattern or tiled region being rotated within the field of view. In some embodiments, the pattern may be configured so that all members of the class inherit a particular set of one or more characteristics 34, thus simplifying the problem of detecting the class to detecting occurrence of those characteristics. In some embodiments, the size of the class can be managed by configuring the pattern with certain symmetries, such as rotational symmetries or other symmetries. Various processing methods as known in the art may be used to detect a characteristic subjected to arbitrary displacements, rotations and other transformations within the field of view of the camera 8246.

The appropriate feature size and spacing of a visual characteristic 34 on surface 30 may depend on factors such as the resolving power, resolution, or pixel density or combination thereof, of a given camera 8246. For example, if a camera, when exposed to a patterned surface placed at a predetermined distance, such as a few millimeters, is capable of distinguishing separate features on the patterned surface as long as those separate features have dimensions on the order of 0.1 mm and are placed no less than 0.1 mm apart, then the appropriate feature size and spacing in a visual characteristic is about 0.1 mm. As another example, if a camera 8246, when exposed to a patterned surface placed a few millimeters distant, is capable of representing the surface to which it is exposed as a digital image of 20 pixels by 20 pixels over a 1 mm$^2$ field of view, then the pattern features should be of linear size and spacing no less than about 0.05 mm.

There may be inherent trade-offs between one or more of the above considerations. For example, patterns with larger features may be more easily and reliably discerned by a camera 8246 of a given resolution. However, adding smaller features to patterns may facilitate providing a larger variety of patterns, which may increase the amount of information conveyed by a pattern, improve the capability for creating non-naturally occurring and substantially distinct patterns, and the like. Smaller pattern features may also allow for smaller overall patterns, which may facilitate detection in the face of alignment errors, as described above.

Therefore, in embodiments of the present technology, the pattern feature size is selected so as to be reliably discerned by a camera 8246 typically used in mobile devices, possibly accounting for a predetermined amount of noise, while also allowing the visual characteristic(s) 34 to be substantially differentiated from other relevant visual characteristic(s) 34, at least within a predetermined error tolerance level.

FIG. 8 illustrates a characteristic 34 of optically reflective objects 36 for presentation to an optical navigation module accordance with embodiments of the present technology. The objects 36 may be formed into a pattern which is repeated in a tiled manner. The tiling may be of a desired size and shape. FIG. 9 also shows a tiled visual characteristic 34 on a surface 30.

Visual characteristic detection (also known as pattern identification) performed by device 110, 120 operates on signals (also known as a visual image or image data) generated by camera 8246. Therefore, pattern detection may comprise detecting information patterns within those signals, rather than directly detecting physical patterns. However, as the camera 8246 is configured to generate signals which are at least in part a representation, such as a digital representation, of a physical pattern discernible by the camera 8246, there is a predetermined correspondence between the signal's information patterns and the physical patterns.

In embodiments of the present invention, the pattern identification functionality of the device 110, 120 may be provided in a pattern identification module operatively coupled to the camera to receive signals therefrom. The pattern identification module may comprise a processor operatively coupled to memory and input/output lines. The pattern identification module may be implemented using general-purpose hardware, for example the central processing unit and shared memory of the mobile device. The pattern identification module may also be implemented using its own dedicated hardware, such as comprising one or more of: a microprocessor or microcontroller, RAM, ROM, interface electronics, and the like. In some embodiments, the pattern detection module and the camera 8246 are implemented at least in part in shared hardware. For example, a microprocessor may receive and process signals from input module sensors as part of implementation of the camera 8246, and also perform pattern detection associated with the pattern identification module.

In some embodiments, pattern identification may be configured to identify occurrence of a visual characteristic 34 even if it is displaced or rotated within the field of view of camera 8246, viewed at an angle, or if the surface containing the pattern is bent or wrinkled up to a predetermined degree. Furthermore, if the pattern is repeated, for example tiled on the surface, pattern identification may be configured to detect occurrence of the pattern from plural separate portions of the pattern. If there are time-varying aspects to the pattern, the pattern identification module may further be configured to analyze dynamics in the camera 8246 signals to facilitate detection. Various appropriate algorithms, such as spatial pattern matching algorithms, for identifying such patterns in the presence of such distortions, or in the presence of other background noise such as ambient optical or electrical signals, sensor imperfections, or the like, would be readily understood by a worker skilled in the art.

In some embodiments, aspects of the present technology are configured to facilitate reliable pattern identification even when the pattern is moving relative to the camera 8246. For example, the camera 8246 may be configured to scan its input at an adequately high rate to avoid motion blur when the pattern is in motion at less than a predetermined maximum speed. Other approaches may include the use of signal processing algorithms to compensate for motion blur, use of suitably sized and shaped patterns which may be easily detected even under predetermined relative motion, or the like, or a combination thereof.

For example, in some embodiments, signals received from the camera 8246 may be processed to obtain a sampled information pattern contained therein, the sampled information pattern corresponding to a spatial pattern detected by the camera 8246. The sampled information pattern may be compared to one or more information patterns stored in memory to determine if there is a match. A match may occur if the sampled information pattern sufficiently corresponds to a stored information pattern or portion thereof, accounting for one or more factors such as: noise, distortions due to field of view misalignment such as rotations, translations or tilting, distortions due to pattern surface folding, colour mismatches, lighting conditions, movement, jitter, or the like, or a combination thereof.

In some embodiments, the present technology may be configured to identify a pattern within a fraction of a second of pattern presentation. In some embodiments, the present technology may be configured to identify a pattern within several seconds or even tens of seconds or minutes of pattern presentation. In some embodiments, resources dedicated to pattern identification may be variable. For example, when the mobile device 110, 120 is in active use, pattern identification operations may be suspended or performed at a lower frequency than when the mobile device 110, 120 is not in active use.

In embodiments of the present technology, an operating condition of the mobile device 110, 120 is adjusted upon identification of a predetermined pattern. Adjustment of the operating condition may occur immediately after identification or after a predetermined delay or in conjunction with other conditions being satisfied.

Adjusting the operating condition may comprise entering a powered down "sleep" mode, entering a reduced functionality mode, suppressing input signals from one or more input modules from having their normal effect on the mobile device, changing or resetting user interface characteristics of the mobile device 110, 120, changing how the mobile device 110, 120 responds to incoming communications or other events, or the like, or a combination thereof.

In some embodiments, adjusting the operating condition comprises suppression of at least some signals from one or more input modules of the mobile device 110, 120, such as touch surfaces, buttons, keys, optical navigation modules, and the like. In this way, inadvertent input events, such as key presses, which may occur during or after insertion of a mobile device 110, 120 into a holster or other container, or onto a predetermined surface, or the like, may be inhibited from triggering undesired functions, such as making a call or performing another operation that may unnecessarily consume battery power. One or more input modules may still be configured to accept at least one predetermined input "unlock" sequence so that the mobile device 110, 120 can be returned to a normal operating condition by the user.

In some embodiments, input modules of a mobile device 110, 120 may be locked upon presentation of the predetermined pattern, and may only be unlocked by entering a security code. This may facilitate automatic securing of the device 110, 120 when the device 110, 120 identifies the predetermined pattern.

In some embodiments, adjusting the operating condition comprises disabling at least some functionality of the mobile device 110, 120. For example, this may allow the mobile device 110, 120 to operate in a reduced power mode when appropriate, thereby prolonging battery life. For example, when the mobile device 110, 120 is inserted into a holster, pocket, placed on a predetermined surface, or the like, certain functions such as lights, display screens, and the like, may be turned off or dimmed. Communication operations of a communication-enabled mobile device may be unaffected, disabled, or operated at a reduced capacity or intermittently, in various embodiments. Power saving features may be preconfigured or user-configurable.

In some embodiments, after the operating condition has shifted in response to pattern identification, the mobile device 110, 120 is configured to continuously or intermittently check whether the predetermined visual characteristic 34 is still being presented to the input module. If, for example, the visual characteristic 34 is no longer identified, the mobile device 110, 120 may revert to a previous operating condition, or shift to another operating condition. For example, such a mobile device 110, 120 may thereby automatically detect its removal from a holster, and subsequently enter a full-power mode or an operational mode with all input modules fully enabled.

Alternatively, the device 110, 120 may cease checking for the visual characteristic upon a single identification of the visual characteristic and rely upon detecting that the load object previously detected is no longer proximate the NFC subsystem in order to change operating conditions of the device 110, 120, generally by executing a second device control command. In this way, device resources will not be drained through repetitive use of the camera 8246.

In embodiments of the present technology, adjustment of the operating condition (also known as executing a device control command) may have other effects. In some embodiments, adjusting the operating condition comprises personalization of the mobile device 110, 120, adjusting operating features of the mobile device 110, 120, or the like. For example, upon detection of a predetermined pattern associated with a particular user, the mobile device may automatically personalize to that user's preferences. As another example, upon detection of a predetermined pattern associated with a particular environment, such as a home or office, the mobile device may automatically adjust to appropriate settings for that environment, such as wallpaper, ringtones, and the like. As another example, upon detection of a predetermined pattern found on a mouse pad, the mobile device can adjust to function as a Bluetooth™ or other wireless mouse. As yet another example, upon detection of a predetermined pattern associated with a mobile device holster, ring settings of a communication-enabled mobile device may be adjusted, for example to enable a vibrate mode, increase ring volume, or the like.

The device 110, 120 may be configured to execute particular commands based on the properties of the covering 10. A covering 10 that has a particular shape or configuration may cause the device 110, 120 to execute commands based on that known shape or configuration. For example, a covering that is secured to the device 110, 120 along one edge of device 110, 120 and is foldable to either cover the front of the device or the rear of the device, may have a different command associated with its detection in comparison to a covering 10 that encloses device 110, 120 along multiple faces and edges of device 110, 120. As coverings come in many configurations, it is preferable that device 110, 120 has both a front-facing camera, and a rear-facing camera, such that coverings 10 that only cover a front or rear face of device 110, 120 may be identified using the method of the present invention.

Although in the exemplary implementations described, sides 14, 16, and end 18 of covering 10 are shown as being substantially continuous, each side 14, 16, and end 18, 20 may be shorter than the corresponding side or end of the device 110, 120. Each side 14, 16, and end 18, 20 may be a solid surface, mesh, elastic material, resilient material, metal, leather, or any other fabric or material. As coverings 10 come in various shapes, sizes, and materials, it should be understood that the present invention is not to be limited to any particular type, size, or configuration of covering 10.

Covering 10 may have a moveable surface 24 as shown in FIGS. 11 and 12 (showing rear and front perspective views of an exemplary embodiment of covering 10) moveable between at least two positions: an open position (where the moveable surface 24 is moved away from a particular location of the covering 10 or device 110, 120), and a closed position (where the moveable surface is moved towards or touches a particular location of the covering 10 or device 110, 120). One or more load objects 32 may be attached to the moveable surface 24. The moveable surface 24 may comprise a strap or moveable panel, attached at one end to an end or side of covering 10. The moveable surface 24 may be hinged or attached by any pivotable or rotatable mechanism to the covering 10. The moveable surface 24 may comprise a panel that may substantially cover a side of the device 110, 120 when moved to such a position. In operation, device 110, 120 may be placed inside the covering, and may be configured to trigger operation of the camera 8246 based on a detection of the load object 32 only when moveable surface 24 is moved such that a load object 32 is brought within proximity of a corresponding antenna 8132b of the device 110, 120 such that the moveable surface 24 is in its closed position. The moveable surface 24 may also include a magnet for attraction with a corresponding magnet 26 in a side 14, 16 of the covering 10 when moving the respective magnets in close proximity with one another. The magnet 26 may be a load object identifiable by the device 110, 120. When held in place by magnetic force, a separate object in the moveable surface 24, or the magnet 26 itself, may trigger operation of the camera 8246.

As shown in FIGS. 11 and 12, covering 10 may include a clip 22 for use in releasably securing the covering 10. The clip 22 may be used to secure the covering 10 to a belt, strap, or other item worn or carried by a user of the device 110, 120. The clip 22 may also help to define the front and rear sides 14 and 16 of the covering 10 as the clip 22 may be preferably located at the rear side 14 of the covering 10. An object 32 may also be attached to the clip 22 for detection by the NFC subsystem 8132 of the device 110, 120 to trigger operation of the camera 8246.

In any of the implementations described, and in particular where the device 110, 120 is placed on a charging surface, false positive detection may be improved by also basing the camera triggering upon input measured from other device 110, 120 subsystems or hardware components, such as a sensor 8134, 726, magnet 724, gyroscope 8240, or GPS unit 8242. In particular, movements of the device 110, 120 may cause the respective gyroscope 8240 to also move. Accordingly, it may be possible for the device 110, 120 to determine whether it is bottom side up, or top side up while covered in the covering 10 through the gyroscope 8240. For example, upon detecting an object 32 through NFC subsystem 8132, the device 110, 120 may be configured to receive data from the gyroscope 8240 to determine which side of the device 110, 120, if any, is facing up. If the device 110, 120 is determined to be facing up, a camera on the rear side of the device 110, 120 may be operated to take a photo of the surface below the device 110, 120. If the device 110, 120 is determined to be facing down, either a camera on the front side of the device 110, 120 may be operated, if available, or no camera operations may be triggered. It may be desirable to prevent the device 110, 120 from taking photos using a camera 8246 facing up and away from a table or charging surface. In particular, if a camera flash is included with device 110, 120 and is configured to be used, operating the flash towards the user whenever time the device 110, 120 is moved in proximity to the surface 30 would be undesirable to the user. Preferably, the device 110, 120 is configured such that the camera and flash only operates when facing the surface 30.

Optionally, GPS 8242 of device 110, 120 may be used together with the object 32 and NFC subsystem 8132 to determine the location of the device 110, 120 proximate surface 30, as GPS 8242 may be used to determine the location of the device 110, 120. If the location of the covering 10 can also be identified, then it may be possible to determine when the device 110, 120 is covered by the covering 10 through the use of GPS. Upon making that determination, the NFC subsystem 8132 may be activated to attempt to detect NFC devices 950 at the covering 10.

Other ways of using GPS 8242, gyroscope 8240, sensors 8134, 726, or other sensors may also be possible together with a combination of a load object 32 attached to the covering 10 and an antenna 8132b connected to NFC subsystem 8132 in order to determine the orientation of the device 110, 120 for the purposes of operating the camera 8246 to identify the surface 30.

Device 110, 120 may be pre-configured with image data associated with particular known surfaces. Each known surface may also be associated with a known covering. Accordingly, the image data or corresponding visual characteristic 34 may be uniquely associated with the surface or covering 10, or the image data may be associated with a particular type or class of covering 10 or other device, such as a charger. The device 110, 120 may also learn additional visual characteristics 34 for association with other surfaces or devices. Device 110, 120 may learn a new visual characteristic 34 and associated surface information by receiving command instructions from a computer workstation or server over a communications network, or directly from a user through user input components of the device 110, 120. In particular, a covering 10 or charger may be sold or otherwise provided in or with associated packaging or documentation. The packaging or documentation may include a QR code, NFC device 950, visual characteristic 34, or other data element included, optionally by affixing thereto. The device 110, 120 may be used to read and interpret the QR code, NFC device 950, visual characteristic 34, or other data element using camera 8246 or NFC subsystem 8132. The device 110, 120 may extract, decode, or otherwise derive data from the QR code, NFC device 950, visual characteristic 34, or other data element to determine the image data or visual characteristic 34 contained therein. A description of the associated covering 10, charger, or other device, and also a default device control command to be performed upon detection of proximity of the device 110, 120 to the covering 10, charger, or other device may also be determined in this way. Optionally, the device 110, 120 may be configured to prompt the user for input regarding the covering 10, charger, or other device and device control command to be associated therewith. The associated device control command may also be changed by the user subsequently. Furthermore, the device 110, 120 may be configured to disable detection of surfaces 30 or disable performance of the device control command for a particular identified visual characteristic 34 for a predetermined time, or until re-enabled by the user.

Optionally, device 110, 120 may learn a visual characteristic 34 through detecting on a surface 30 through performance of the method of the present invention. When a known visual characteristic 34 is detected through operation of the camera 8246 triggered by detection of load object 32, the device 110, 120 may prompt the user for information regarding the surface 30 and device control command to be performed upon future detection of the surface 30. As the device 110, 120 may be inserted within a covering 10 upon first detecting the unknown visual characteristic, the device 110, 120 may be configured to wait until no longer detecting load object 32 before prompting the user for this information. Alternatively, the device 110, 120 may attempt to retrieve information regarding surface 30 and any associated covering 10, charger, or other device from a computer server 912 over a communications network 900. If found at the computer server 912, the device 110, 120 may store an association of image data representing the visual characteristic with the surface 30, any information regarding the covering 10, charger, or other device including the surface 30, and a default device control command.

Figure 10:
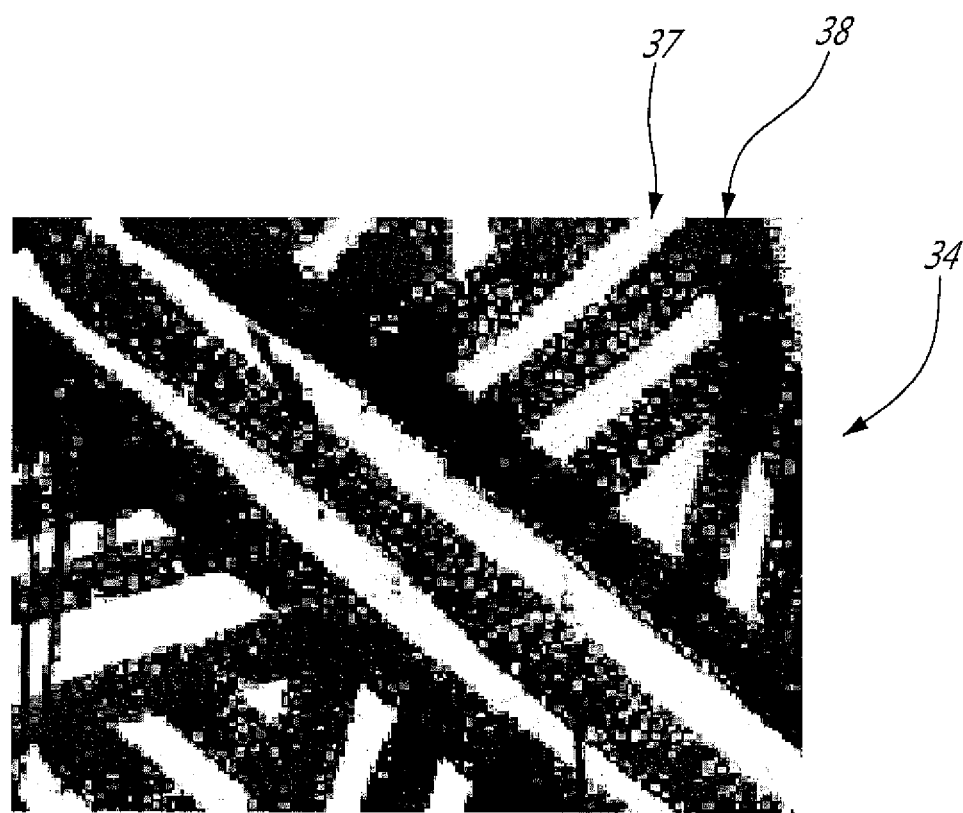
FIG. 10 is a representative image captured by a camera of a mobile device of a visual characteristic useful in implementing various aspects of the disclosure.

As many surfaces 30 to be identified are located within substantially enclosed coverings 10, which may feature reduced lighting conditions, device 110, 120 may also comprise a camera flash light which may be operated together with operation of the camera 8246 in order to take a photo with usable visual information contained therein. Furthermore, each visual characteristic 34 is likely to be positioned in close proximity to device 110, 120. Preferably, each visual characteristic 34 is configured to be identifiable by device 110, 120 when photographed at close proximity to camera 8246. In a non-limiting, exemplary implementation, the visual characteristic 34 may comprise at least one reflective portion 37 and at least one nonreflective portion 38, as shown in FIG. 10. Shining light from the flash on the reflective portions may reflect light into the camera 8246, while the nonreflective (or less reflective) portions will not reflect as much or any light into the camera 8246. The visual characteristic 34 or pattern formed through arrangement of the reflective and nonreflective portions may then be determined by the device 110, 120 and compared against known image data in accordance with the method of the present invention. Instead of using areas of varying reflectivity, or in addition thereto, the visual characteristic 34 may be configured with at least two portions comprising distinct visual contrasts or colours from one another. The visual characteristics 34 may comprise multiple colours, only black and white portions, or may be entirely the same colour as the rest of the interior surface(s) 30 of the covering 10 or other surfaces of the charger or other device, as applicable.

Figure 6A:
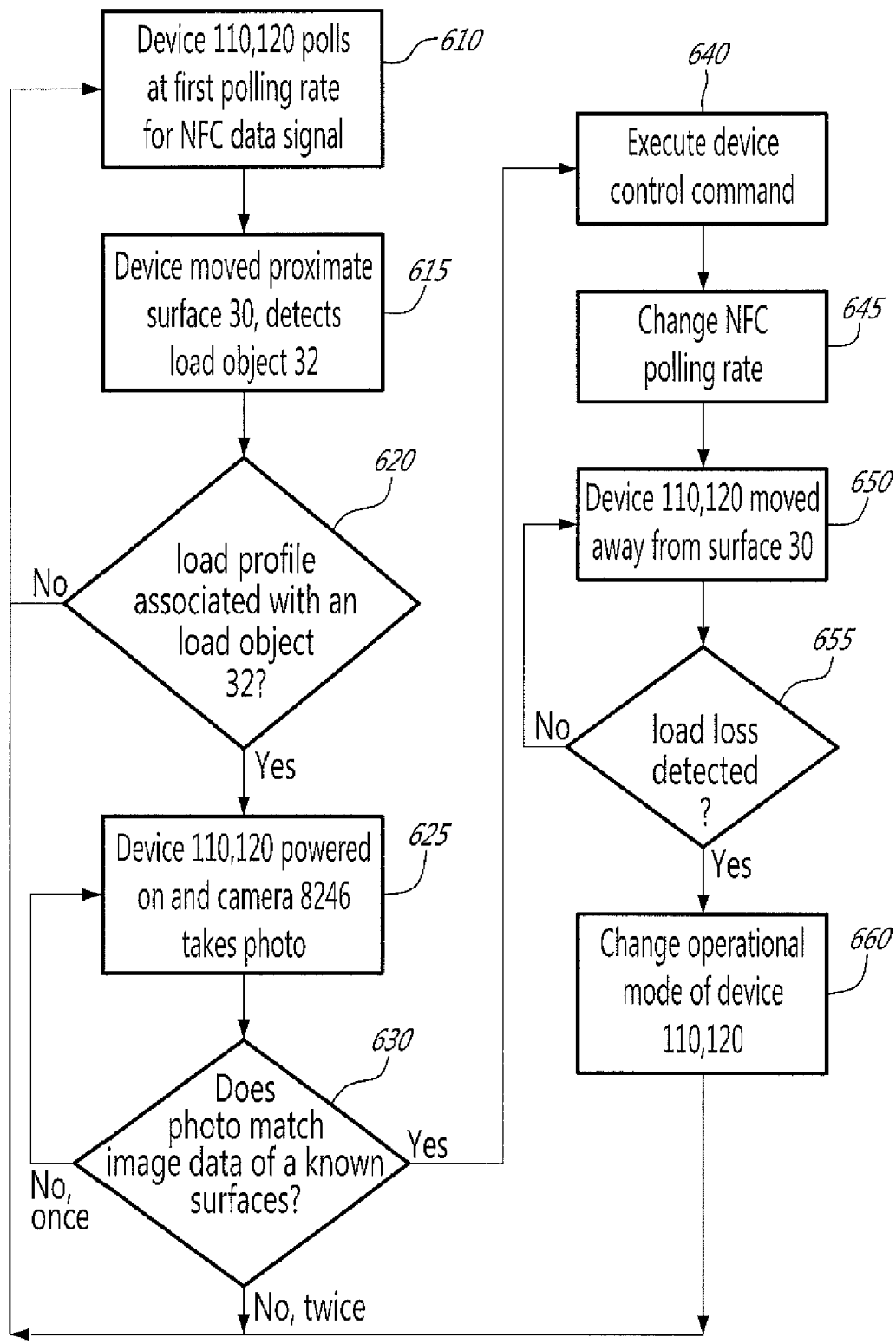

With reference to FIG. 6a, an exemplary non-limiting implementation of the method of the present invention will be described. At block 610, the NFC subsystem 8132 is polling at a first polling rate. The device 110, 120 may be operating in a lower power mode, sleep state, or be otherwise powered off while the NFC subsystem 8132 is polling at the first polling rate. Optionally, this first polling is performed in a low-power tag detect mode ("LPTD") at approximately 3 Hz. At block 615, the device 110, 120 is moved within proximity of a surface 30 of covering 10 and NFC subsystem 8132 detects load object 32 (e.g. a metal plate) through a constant load associated with an load profile stored by the device 110, 120. At block 620, the device 110, 120 determines whether the load object 32 is of a load profile associated with load object (s) 32 used for implementation of the method of the present invention. If so, at block 625 the device 110, 120 is then powered on or otherwise awoken from its sleep state in order to operate camera 8246 to take a picture. At block 630 the picture is compared to image data associated with known surfaces stored at the device 110, 120. If no match is found, blocks 625 and 630 may be repeated in case the picture was not sufficiently reflective of the surface photographed. If no match is again found, the method may return to block 610, and no further action may be taken with respect to the load detection. However, if a match is found, the device 110, 120 may execute a device control command at block 640. Optionally, at block 645, the NFC subsystem 8132 may change its polling rate to a second polling rate that is reduced from the first polling rate. For example, the second polling rate may be at 1 Hz, also in a LPTD mode. In one example of block 640, the device control command may comprise the device 110, 120 entering a low battery mode. At block 650, the device 110, 120 is moved away from the surface having the load object 32, and the NFC subsystem 8132 detects a loss of load at block 655. At block 660, the NFC subsystem 8132 then changes the operation mode of device 110, 120, optionally by interrupting the processor of device 110, 120 to wake up the device 110, 120, and reverting the NFC subsystem to its first polling rate LPTD mode at block 610.

With reference to FIG. 6b, another exemplary non-limiting implementation of the method of the present invention will be described. At block 670, device 110, 120 detects a load upon NFC subsystem 8132. At block 680, the device 110, 120 triggers operation of camera 8246 to take a picture of surface 30 proximate the camera 8246. At block 690, device 110, 120 executes a device control command if the picture corresponds to image data stored on the device 110, 120.

In a non-limiting, exemplary implementation of the present invention, when the surface 30 is part of covering 10, the covering 10 may be configured in a particular way to encourage placement of the device 110, 120 in a particular orientation into the covering 10. For example, the top, bottom, or side edges of the covering 10 may be shaped to correspond to distinctive shapes of corresponding edges of device 110, 120 such that the covering 10 better mates to the device 110, 120 when device 110, 120 is inserted in one direction over the other. Optionally, guide rails or other physical features of covering 10 may suggest to a user an optimal insertion orientation of device 110, 120 into the covering. By encouraging particular orientations of device 110, 120 with respect to covering 10, the amount of surface area of surface 30 of covering 10 covered by visual characteristic 34 may be reduced. For example, the visual characteristic 34 may then only be positioned on one interior side of the covering 10, or proximate only one end (e.g. top end or bottom end) of covering 10, as the position of camera 8246 can be reasonably predicted within covering 10. Operation of camera 8246 may also be delayed by a short time (e.g. 1 to 4 seconds, or more, or less) upon detection of the load object 32 such that the camera 8246 is less likely to take a picture while the device 110, 120 is only partially inserted into the covering 10.

Any or all of the functionality described herein including the use of the NFC subsystem 8132 to detect loads, or load objects 32, or the device 110, 120 operating the camera, storing image data, and executing device control commands, may be provided through configuration of the device 110, 120 through initial firmware, a firmware update, initial operating system, an operating system update, or through an application (or "app") installed on the device 110, 120.

In further aspects, the disclosure provides systems, devices, methods, and computer programming products, including non-transient machine-readable instruction sets, for use in implementing such methods and enabling control of mobile and other communication and computing devices.

Although the disclosure has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in the invention, the scope of which is defined by the claims.

Except to the extent explicitly stated or inherent within the processes described, including any optional steps or components thereof, no required order, sequence, or combination is intended or implied. As will be will be understood by those skilled in the relevant arts, with respect to both processes and any systems, devices, etc., described herein, a wide range of variations is possible, and even advantageous, in various circumstances, without departing from the scope of the invention, which is to be limited only by the claims.

What is claimed is:

1. A method performed by at least one processor of a NFC-capable mobile device, the NFC-capable mobile device comprising a camera and at least one NFC subsystem, the method comprising:
    upon insertion of the NFC-capable mobile device into a holster, detecting a load upon the at least one NFC subsystem of the NFC-capable mobile device, the load being associated with a surface proximate the NFC-capable mobile device;
    based at least partly on a determination of sustained intensity of the load, triggering operation of the camera to capture an image of a visual characteristic of the surface proximate the NFC-capable mobile device, the visual characteristic disposed on an interior surface of the holster proximate the camera; and
    based at least partly on a determined correspondence of the captured image with stored image data, executing a device control command.

2. The method of claim 1 comprising, based at least partly on a determined lack of correspondence of the captured image with the stored image data, associating the captured image with an identification of the surface proximate the NFC-capable mobile device based on the receipt of user input.

3. The method of claim 1, wherein the captured image is that of a visual characteristic comprising at least one first portion and at least one second portion where the first portion has a higher reflectivity than the second portion.

4. The method of claim 1, wherein the surface is located on an interior portion of a covering for the NFC-capable mobile device.

5. The method of claim 1, wherein the surface is located on a charging device for contact with the NFC-capable mobile device.

6. The method of claim 1, wherein the load is associated with a metallic plate attached to or part of the surface proximate of the NFC-capable mobile device.

7. The method of claim 1, wherein the sustained intensity determination comprises determining a correspondence between the sustained intensity of the load and at least one stored load profile.

8. The method of claim 1, wherein the sustained intensity of the load comprises substantial saturation of the at least one NFC subsystem.

9. The method of claim 1 comprising, based at least partly on the at least one NFC subsystem detecting removal of the detected load, executing a second device control command.

10. A method performed by at least one processor of a NFC-capable mobile device, the NFC-capable mobile device comprising a camera and at least one NFC subsystem, the method comprising:
    upon insertion of the NFC-capable mobile device into a holster, detecting a load upon the at least one NFC subsystem of the NFC-capable mobile device;
    based at least partly on a determination of sustained intensity of the load, triggering operation of the camera to capture an image of a visual characteristic disposed on an interior surface of the holster proximate the camera; and
    based at least partly on a determined correspondence of the captured image with stored image data, executing a device control command.

11. The method of claim 10, wherein the load is associated with a load object attached to or part of the holster.

12. The method of claim 10, wherein the determined correspondence of the captured image with stored image data is indicative of an identification of the holster.

13. The method of claim 12, wherein the device control command is based on the identification of the holster.

14. A NFC-capable mobile device comprising:
    at least one processor;
    a camera;
    at least one NFC subsystem; and
    a medium including machine-readable instructions executable by at least one processor and configured to cause the at least one processor to:
    upon insertion of the NFC-capable mobile device into a holster, detect a load upon the at least one NFC subsystem of the NFC-capable mobile device, the load associated with a surface proximate the NFC-capable mobile device;
    based at least partly on a determination of sustained intensity of the load, trigger operation of the camera to capture an image of a visual characteristic of the surface proximate the NFC-capable mobile device, the visual characteristic disposed on an interior surface of the holster proximate the camera; and
    based at least partly on a determined correspondence of the captured image with stored image data, execute a device control command.

15. The NFC-capable mobile device of claim 14, wherein the instructions are configured to cause the processor to, based at least partly on a determined lack of correspondence of the captured image with the stored image data, associate the captured image with an identification of the surface proximate the NFC-capable mobile device based on the receipt of user input.

16. The NFC-capable mobile device of claim 14, wherein the NFC-capable mobile device comprises a camera flash configured to illuminate the surface proximate the camera, wherein the instructions are configured to cause the processor to trigger operation of the camera flash together with the operation of the camera.

17. The NFC-capable mobile device of claim 14, wherein the detected load is indicative of a metallic plate proximate to the NFC-capable mobile device.

18. The NFC-capable mobile device of claim 14, wherein the sustained intensity determination comprises determining a correspondence between the sustained intensity of the load and at least one stored load profile.

19. The NFC-capable mobile device of claim 14, wherein the sustained intensity of load comprises saturation of the at least one NFC subsystem.

20. The NFC-capable mobile device of claim 14, wherein the instructions are configured to cause the processor to, based at least partly on the at least one NEC subsystem detecting removal of the detected load, execute a second device control command.

* * * * *

UNITED STATES PATENT AND TRADEMARK OFFICE
CERTIFICATE OF CORRECTION

PATENT NO. : 9,020,428 B2
APPLICATION NO. : 13/939734
DATED : April 28, 2015
INVENTOR(S) : Meunier et al.

Page 1 of 1

It is certified that error appears in the above-identified patent and that said Letters Patent is hereby corrected as shown below:

In the Claims:

Col. 27 line 42: claim 20 delete "based at least partly on the at least one NEC subsystem".
Insert --based at least partly on the at least one NFC subsystem--.

Signed and Sealed this
Twentieth Day of October, 2015

Michelle K. Lee
*Director of the United States Patent and Trademark Office*